(12) United States Patent
Havea et al.

(10) Patent No.: US 10,888,100 B2
(45) Date of Patent: Jan. 12, 2021

(54) DAIRY PRODUCT AND PROCESS

(71) Applicant: Fonterra Co-Operative Group Limited, Auckland (NZ)

(72) Inventors: Palatasa Havea, Palmerston North (NZ); John Edward Grant, Palmerston North (NZ); Michael Jiu Wai Hii, Palmerston North (NZ); Peter Gilbert Wiles, Palmerston North (NZ)

(73) Assignee: Fonterra Co-Operative Group Limited, Auckland (NZ)

( * ) Notice: Subject to any disclaimer, the term of this patent is extended or adjusted under 35 U.S.C. 154(b) by 0 days.

(21) Appl. No.: 16/214,548

(22) Filed: Dec. 10, 2018

(65) Prior Publication Data

US 2019/0116827 A1 Apr. 25, 2019

Related U.S. Application Data

(63) Continuation of application No. 15/362,216, filed on Nov. 28, 2016, now abandoned, which is a continuation of application No. 13/264,564, filed as application No. PCT/NZ2010/000072 on Apr. 15, 2010, now abandoned.

(60) Provisional application No. 61/169,437, filed on Apr. 15, 2009.

(30) Foreign Application Priority Data

Feb. 15, 2010 (NZ) ........................................ 583320

(51) Int. Cl.
| | | |
|---|---|---|
| A23C 21/00 | (2006.01) | |
| A23C 1/00 | (2006.01) | |
| A23C 1/14 | (2006.01) | |
| A23C 9/14 | (2006.01) | |
| A23J 1/20 | (2006.01) | |
| A23J 3/08 | (2006.01) | |
| A23C 9/13 | (2006.01) | |
| A23C 19/082 | (2006.01) | |

(52) U.S. Cl.
CPC .............. *A23C 21/00* (2013.01); *A23C 1/00* (2013.01); *A23C 1/14* (2013.01); *A23C 9/1307* (2013.01); *A23C 9/14* (2013.01); *A23C 19/082* (2013.01); *A23J 1/20* (2013.01); *A23J 1/205* (2013.01); *A23J 3/08* (2013.01)

(58) Field of Classification Search
CPC .. A23C 21/00; A23C 1/00; A23C 1/14; A23C 9/14; A23J 3/08; A23J 1/20; A23J 1/205; A23V 9/14
USPC ........................................................ 426/41
See application file for complete search history.

(56) References Cited

U.S. PATENT DOCUMENTS

| | | |
|---|---|---|
| 3,252,961 A | 5/1966 | Rodgers et al. |
| 4,110,476 A | 8/1978 | Rhodes |
| 4,734,287 A | 3/1988 | Singer et al. |
| 4,985,270 A | 1/1991 | Singer et al. |
| 5,039,532 A | 8/1991 | Jost et al. |
| 5,494,696 A | 2/1996 | Holst et al. |
| 5,882,705 A | 3/1999 | Sato et al. |
| 6,767,575 B1 | 7/2004 | Huss et al. |
| 2002/0012720 A1 | 1/2002 | Chen |
| 2002/0039617 A1 | 4/2002 | Villagran et al. |
| 2004/0126477 A1 | 7/2004 | Coleman et al. |
| 2005/0220978 A1 | 10/2005 | Arudi et al. |
| 2006/0204643 A1 | 9/2006 | Merrill et al. |

FOREIGN PATENT DOCUMENTS

| | | |
|---|---|---|
| DE | 236 449 | 6/1986 |
| EP | 0 485 663 | 5/1992 |
| EP | 1 749 447 | 2/2007 |
| EP | 1 925 207 | 5/2008 |
| JP | H08-256686 | 10/1996 |
| JP | H09-094059 | 4/1997 |
| JP | 2002-165557 | 6/2002 |
| WO | WO 93/07761 | 4/1993 |
| WO | WO 02/060279 | 8/2002 |
| WO | WO 2006/019320 | 2/2006 |
| WO | WO 2006/058538 | 6/2006 |
| WO | WO 2007/054587 | 5/2007 |

(Continued)

OTHER PUBLICATIONS

Georgiadis et al, "Dynamic modelling and simulation of plate heat exchangers under milk fouling", Chemical Engineering Science, vol. 55, No. 9, May 1, 2000, pp. 1605-1619.
International Search Report dated Jun. 9, 2010 in Application No. PCT/NZ2010/000072, filed Apr. 15, 2010.
Extended European Search Report dated May 22, 2015 in European Application No. 10764718.2.

(Continued)

*Primary Examiner* — Jeffrey P Mornhinweg
(74) *Attorney, Agent, or Firm* — Knobbe Martens Olson & Bear LLP

(57) ABSTRACT

A method for preparing a modified whey protein concentrate (WPC) or whey protein isolate (WPI) is described. It involves (a) providing an aqueous WPC or WPI solution having a protein concentration of 15-50% (w/v), at a pH of 4.7-8.5; (b) heat treating the solution to more than 50 DEG C, for a time that allows protein denaturation to occur the heat treating comprising heating the solution while under conditions of turbulent flow. At the end of the heat treatment, the heat treated material may be promptly transferred to a drier or to be mixed with other ingredients. The heat-treated WPC or WPI is not subjected to a mechanical shear process prior to the transfer other than where liquid is converted into droplets to facilitate drying. The modified WPC is useful in the manufacture of food and drinks where a high protein content is desired without undesirable changes in texture.

20 Claims, 9 Drawing Sheets

(56) References Cited

FOREIGN PATENT DOCUMENTS

| | | |
|---|---|---|
| WO | WO 2007/108709 | 9/2007 |
| WO | WO 2008/063115 | 5/2008 |

DAIRY PRODUCT AND PROCESS

CROSS-REFERENCE TO RELATED APPLICATIONS

The instant application is a continuation of U.S. application Ser. No. 15/362,216 filed on Nov. 28, 2016, which is a continuation of U.S. application Ser. No. 13/264,564 filed on Jan. 13, 2012, which is the US national phase filed under 35 U.S.C. § 371 of PCT/NZ2010/000072 filed on Apr. 15, 2010, and claims the benefit of U.S. provisional application No. 61/169,437 filed on Apr. 15, 2009 and New Zealand patent application No. 583320 filed on Feb. 15, 2010.

TECHNICAL FIELD

This invention relates to a process of making a whey protein concentrate (WPC) comprising denatured whey proteins.

BACKGROUND ART

Aggregates of heat denatured whey protein have been produced for many years. Lactalbumin is long known as a commercial product prepared by heating whey until the protein coagulates and is rendered insoluble. The insoluble material is filtered off, washed and dried. Lactalbumin has found many uses ranging from stock food to enhancing the protein content of bread and bakery products. The protein depleted whey stream resulting from the recovery of the lactalbumin may also be used as a stock food, but is otherwise expensive to dispose of.

Many attempts have been made to make the production of denatured whey protein both more economic and more commercially useful. Much of the effort has been directed towards increasing the protein content of the whey by selectively removing the lactose content. The achievement of high protein contents is made possible by the application of established technologies such as ultrafiltration, diafiltration and ion exchange. As proteins with good nutritional value, these products are useful as food ingredients.

For many nutritional applications, the effect of whey protein on the texture or rheology of the final product is useful. These applications frequently rely on the ability of WPCs to form heat-induced gels. In other applications, these gelling properties are undesirable.

Heat-denatured (or modified) whey protein products have become a more recent category of products in the market. A number of methods for the manufacture of this category have been invented in recent years.

Whey protein will form a gel when heated under appropriate conditions (>75° C., ≈pH 6-8, >6 g TS/100 g) (Havea, P., Singh, H., Creamer, L. K. & Campanella, O. H., Electrophoretic characterization of the protein products formed during heat treatment of whey protein concentrate solutions. *Journal of Dairy Research*, 65, 79-91, 1998).

In U.S. Pat. No. 4,734,287 (Singer et al.) there is a review of the art of heat denatured whey protein that is particularly directed towards the production of insoluble aggregates and the problems associated with the same. A process is taught to produce micro-particulate whey protein aggregates using a combination of heat and mechanical action. The document in full is included by reference.

WO/2001/005247 [Hudson et al] disclose a process for preparing whey protein gels that include denatured particles. Initially the whey protein is treated to hydrolyse it using either acid or enzymes. After a heat treatment, the resulting turbid, particulate gels have an opaque milky-white appearance due to large aggregates scattering light. Mixed gels, the final subset, possess physical and functional properties of both fine-stranded and particulate, and are produced with intermediate salt concentrations (E. Foegeding et al., (1998)). The condensing of linear strands into larger aggregates is thought to be the causal mechanism for mixed gel formation. The gelled material may be dried to yield particles in the range 1 μm to 100 μm. Hudson et al teach little about their heating process (home manufacture is contemplated) beyond heating the dispersions in aluminum freeze-drier pans (13.5 cm×13.5 cm) at 80° C. for 45 minutes or 3 hours . . . .

Huss and Spiegel in U.S. Pat. No. 6,767,575 disclose a process for producing micro-particulated whey protein using relatively dilute protein streams (<3% w/v protein), after heating and in contrast to the processes known to those skilled in the art, no further shearing operations are carried out, to the extent that the inventive process is carried out under essentially non-shearing conditions. The shear rates occurring due to the unavoidable pumping and stirring operations mentioned are generally not greater than 2000 s$^{-1}$ to 1000 s$^{-1}$, preferably not greater than 500 s$^{-1}$. The hot-holding of the raw material can also take place in complete absence of agitation.

WO/2007/039296 A1 [Thorsen and Koeningsfeldt] disclose a proprietary mechanical device to affect the denaturing of protein solutions while applying heat.

In EP 0520581, Oudeman teaches a process for preparing a synthetic milk product using denatured whey proteins, wherein calcium ions are added to a whey protein concentrate having a protein content of 25-50%, relative to the solids, and a pH value of 5.9-6.7, the concentrate is subsequently subjected to a heat treatment and homogenization, whereafter the product is optionally evaporated and dried.

U.S. Pat. No. 5,494,696 [Holst et al] disclose a whey protein denaturation process where diluted whey retentate (10-20% solids and 65-95% of the solids is protein) is recycled through a homogenizer while it is heated directly by steam injection. It is noted that: The flow rate of the product through the pipe must be kept sufficiently high in order to avoid deposits on the pipe walls and to ensure a sufficiently low viscosity of the pseudoplastic liquid. Generally, this is ensured when the flow rate is at least 2 m/s. Directly after the heat treatment, the liquid stream is dried. The resulting powder is said to have particle sizes of around 30 to 60 m. Holst et al declare: It is surprising that the new, partially denatured whey protein product with a denaturation level of preferably about 80% and a mean particle diameter in the range of preferably 40 to 50 μm has such good organoleptic properties and is free of any sandy or gritty aftertaste, whereas denatured whey proteins with similar particle sizes, as known, because of their bad organoleptic properties, particularly their sandy sensation in the mouth, are unsuitable of use as an additive to mayonnaise which is produced cold.

US 2006/0204643 [Merrill et al] disclose a heat denaturation process for whey protein concentrates where: the initial slurry containing native whey protein is heated to denature at least some of the protein. As noted above, the slurry may be heated to a temperature of about 140° F. to about 300° F., for a period of about 10 to about 60 seconds. The slurry may be mixed during at least a portion of the heating period to reduce, and/or prevent, denatured whey protein from coagulating around the heating elements in cooker. One exemplary device for performing this operation is a single or twin-screw mixer or a twin-screw extruder, either fitted for steam injection or having a heated jacket, or a combination of both. When using a twin-screw mixer or extruder to perform the heating and mixing, the screws (i.e., augers) are typically arranged so they overlap, to insure thorough mixing. During or after heating, the slurry is subjected to high shear conditions, which reduces the coagulants that may have formed as the whey protein denatures. High shear conditions as used herein generally refer to conditions in which 10,000 to 500,000 $s^{-1}$ of shear is applied. In some methods, the slurry is typically sheared by a high-shear mixer or colloid mill, at a temperature of about 90 to 300° F. for about 0.01 to 0.5 seconds.

In another invention, WO 2008/063115 A1 [Tetra Laval Holdings & Finance SA] disclosed a process where a protein solution is heated using a tubular heater under pressure (40 to 80 bar) followed by mechanical shearing in a homogenizer to break down the protein aggregates to form fine particles (3 to 10 μm diameter).

In another two publications (EP0412590 & EP0347237) [both assigned to Unilever] processes are disclosed for preparing micro-particulate whey protein dispersions. In both publications, little or no shear is used but the protein concentration is limited to relatively dilute solutions (less than 15% but preferably around 7% protein).

WO2006057968 (Wolfschoon-Pombo [Wolfschoon-Pompo] et al) discloses a cream cheese process where a whey protein concentrate stream of 11 to 12% protein is heat treated in a tubular heater using turbulent conditions to yield a stream of particles of which 90% (d90) are less than 95 μm and half the particles (d50) are less than 12 μm. Further shear may then be applied (homogenization) to achieve considerably finer particles with d90<9 μm.

In DD236449, Borgwardt et al disclose that whey protein concentrate solutions with a protein content of 8-11%, a solids content of 16-22% and a pH of 4.2-5.2, can be treated by heating at 85-95° C. for 5 to 20 minutes under turbulent flow conditions to yield thermally stable non-agglomerating colloidal whey protein suspensions. The suspension is stabilised by instantaneous cooling. The suspension of protein particles may be dried. Borgwardt also teach that although the Reynolds number must exceed 2000, the wall shear stress must also exceed 12 $kg/ms^2$. The art teaches that heat treated protein slurries are shear thinning (pseudoplastic liquid). For a person skilled in hydrodynamics, it is unclear how to interpret (hence implement) Borgwardt et al's shear stress condition without more detailed information of their fluid's flow characteristics.

It is an object of the present invention to provide a simple process for preparing denatured whey protein at high protein concentration; and/or to provide a method for the manufacture of denatured whey protein products at high concentrations without the need for homogenisers or scrape surface heat exchangers; and/or to offer the public a useful choice.

DISCLOSURE OF THE INVENTION

In one aspect the invention provides a method for preparing a dried modified whey protein concentrate (WPC) or whey protein isolate (WPI), comprising:
(a) providing an aqueous WPC or WPI solution having a protein concentration of 15-50% (w/v), at a pH of 4.7-8.5;
(b) heat treating the solution to more than 50° C., for a time that allows protein denaturation to occur; the heat treating comprising heating the solution while under conditions of turbulent flow preferably with a Reynolds number of at least 500;
(c) at the end of the heat treatment, transferring the heat treated material directly to a drier; and
(d) drying the heat-treated WPC or WPI,
wherein the heat-treated WPC or WPI is not subjected to a mechanical shear process prior to drying other than where liquid is converted into droplets to facilitate drying.

In a further aspect the invention provides a method for preparing a heat-treated whey protein concentrate (WPC) or whey protein isolate (WPI), comprising:
(a) providing an aqueous WPC or WPI solution having a protein concentration of 15-50% (w/v), at a pH of 4.7-8.5;
(b) heat treating the solution to more than 50° C. for a time that allows protein denaturation to occur; the heat treating comprising heating the solution while under conditions of turbulent flow preferably with a Reynolds number of at least 500, Preferably in this aspect the process is followed by step (c):
(c) at the end of the heat treatment directly transferring the heat treated material either to a drier to be dried or to a mixer to be mixed with other ingredients; and the heat treated WPC or WPI is not subjected to particle size reduction prior to step (c).

In a further aspect the invention provides a method for preparing a dried modified whey protein concentrate (WPC) or whey protein isolate (WPI), comprising:
(a) providing an aqueous WPC or WPI solution having a protein concentration of 15-50% (w/v), at a pH of 4.7-8.5;
(b) heat treating the solution to more than 50° C., for a time that allows protein denaturation to occur; the heat treating comprising heating the solution while under conditions of turbulent flow preferably with a Reynolds number of at least 500;
(c) at the end of the heat treatment, promptly transferring the heat treated material to a drier; and
(d) drying the heat-treated WPC or WPI,
wherein the heat-treated WPC or WPI is not subjected to a mechanical shear process prior to drying other than where liquid is converted into droplets to facilitate drying.

In another aspect the invention provides a method for preparing a mixture comprising a liquid whey protein concentrate (WPC) or whey protein isolate (WPI), comprising:
(a) providing an aqueous WPC or WPI solution having a protein concentration of 15-50% (w/v), at a pH of 4.7-8.5;
(b) heat treating the solution to more than 50° C., for a time that allows protein denaturation to occur; the heat treating comprising heating the solution while under conditions of turbulent flow preferably with a Reynolds number of at least 500;
(c) at the end of the heat treatment, transferring the heat treated material directly to a mixer to be mixed with at least one other ingredients, including at least one of the group consisting of milk, skim milk, fat, a carbohydrate, milk retentate, or skim milk retentate;
wherein the heat-treated WPC or WPI is not subjected to a mechanical shear process prior to mixing with the other ingredients.

Preferably the pH of the WPC concentrate prior to heating is adjusted to between 5.0 and 8.5, more preferably between 5.5 and 8.5 and most preferably 6.0 and 8.0, most preferably 6.5-7.5.

Preferably the protein concentration of the WPC concentrate prior to heating is 16-40%, more preferably 17-30%.

The WPC concentrate prior to heating may be adjusted for its calcium concentration. The calcium adjustment may include depletion by any convenient process i.e. ion exchange, or may be increased by the addition of a calcium salt e.g. calcium chloride.

The heating medium is preferably steam or heated water.

In preferred embodiments of each aspect of the invention, the heat treating occurs as the WPC or WPI solution passes along a heated flow path, preferably a tube with an inside diameter greater than 5 mm and less than 150 mm.

In preferred embodiments a long tubular thermal reactor is used. Typically, the thermal reactor has a length based on its nominal hold up time of between 1 second and 1000 seconds.

The temperature of the solution at the end of reactor may be between 45° C. and 150° C., preferably between 50° C. and 130° C. and more preferably between 60° C. and 110° C.

The thermal reactor may be fed using a pump with a pressure rating of between 3 Bar and 1000 Bar, preferably between 5 Bar and 500 Bar and more preferably between 10 Bar and 350 Bar. A supplementary pump may be useful to feed the high pressure pump.

In some embodiments the product exiting the flow path is used as an ingredient in preparing a food product.

In other embodiments the flow path supplies a drier to convert the solution containing denatured whey protein complexes into a dried product.

In a further aspect, the invention provides a method for preparing a dried modified WPC or WPI with at least 20% (w/w) of the TS as whey protein, preferably at least 40%, more preferably over 50%, and even more preferably 50-95% protein, most preferably 52-90%, comprising:
  (a) preparing an aqueous WPC or WPI having 15-50% (w/v) whey protein, preferably 16-40%, even more preferably 17-30%, and most preferably 17-25%, at a pH of 4.7-8.5, preferably 5.5-8.5 and more preferably 6.0-8.0, most preferably 6.5-7.5;
  (b) using a high pressure pump to feed the protein concentrate at a pressure of between 3 to 1000 bars, preferably 5 to 500 bars, most preferably 10 to 350 bars into a high pressure heater, the flow of the product is such that a turbulent flow is effected preferably with a Reynolds number of at least 500;
  (c) heat treating the solution obtained to more than 50° C., preferably more than 60° C., more preferably more than 70° C. and most preferably more than 80° C., for a time that allows protein denaturation to occur;
  (d) at the end of the heat treatment, promptly transferring the heat-treated material to a drier; and
  (e) drying the heat-treated WPC or WPI,
wherein the treated WPC stream from the heat treatment arrangement (c) is not subject to a particle size reduction procedure prior to drying.

Preferably, the heat treatment zone is coupled directly to the inlet of the drier.

A "WPC" is a fraction of whey from which lactose has been at least partially removed to increase the protein content to at least 20% (w/w). Preferably the WPC has at least 40%, more preferably at least 55% (w/w), even more preferably at least 65% and most preferably at least 75% of the TS as whey protein. Preferably, the proportions of the whey proteins are substantially unaltered relative to those of the whey from which the WPC is derived. Preferably, the WPC is an evaporated whey protein retentate. For the purposes of this specification, the term "WPC" includes WPIs when the context allows.

A "WPI" is a WPC having at least 90% of the TS as whey protein.

In another aspect of the invention, the invention provides products of each method of the invention.

In this specification the term "retentate" means the retained fraction after ultrafiltration of whey or a source or whey, milk or skim milk. Such fractions have increased percentage protein and lower percentage lactose as total solids than does the starting material.

The term "directly" in the context of material being transferred directly means that the material is transferred from the heater to the next named step without any intervening processing.

The term "promptly" means in less than 2 minutes, preferably less than 1 minute, more preferably less than 30 seconds, most preferably less than 10 seconds.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

Various methods can be used to estimate the denaturation level (%) or determine the denatured protein (%) depending on the context of the experimentation. For the production of insoluble whey protein colloidal particles, the simplest method is to measure the proportion of the starting protein which has been rendered insoluble (settles out as a precipitate) at pH 4.6. More detailed information on denaturation can be obtained by HPLC methods—see Huss and Spiegel in U.S. Pat. No. 6,767,575, hereby incorporated by reference in its entirety.

The WPC starting material in (a) may be prepared by ultrafiltration of a raw whey at a pH of about 4.0-6.4, preferably pH 4.0-6.2, more preferably pH 4.0-6.2 and most preferably pH 4.6-6.0. Using ultrafiltration, water, lactose and minerals are removed, resulting in a retentate stream. Diafiltration may be applied during ultrafiltration to further reduce the level of dialyzable components. The ultrafiltration is typically carried out at 10-50° C. Ion exchange may be used to manipulate the ionic content of the proteinaceous stream. The level of calcium ions may be manipulated in some embodiments by ion exchange and replaced with monovalent cations. In other embodiments, the level of calcium may be increased by the addition of a soluble food approved calcium salt e.g. calcium chloride. The protein concentration of the WPC is preferably further increased by evaporation. Alternatively, the starting material may be a reconstituted whey protein prepared from a dried WPC or WPI.

The whey for the preparation of the WPC is preferably acid whey or cheese whey. Acid whey has a pH of about 4.6, whereas cheese whey has a pH of about 5.6-6.4. The pH of the concentrate at heating can be varied depending on the desired functional properties of the final modified whey protein concentrate or powder. Those who are skilled in the art would know that heat treatment of whey protein under different pHs would result in modifying the protein-protein interactions in the heated system, giving rise to final products with varied functional properties. (Hudson et al in WO/2001/005247 discuss some of the art of manipulating the properties of whey protein streams relating to their denaturation/gelation characteristics.)

The protein concentration of the whey or WPC for the purposes of this specification are determined using the Kjeldahl nitrogen analysis method and the application of a Kjeldahl factor of 6.38.

The use of a high pressure tubular heater is preferred as a flow conduit, mainly because of its simplicity. The heating time varies according to the temperature used. At higher temperatures, for example 100° C., only a few seconds may be required. At 70° C., heating for a longer period may be required. It is also important to note that the degree of heating is a way of modifying the functional properties of the final powder. In different food applications, a wide range of modified WPCs with varied levels of protein denaturation may be required, and this invention provides a simple means of making these, just by modifying the protein concentration, pH, ionic environment, heating time and/or heating temperature.

"High pressure heater" refers to a shell and tube heater in which the product is fed through a tube that is enclosed in a heating chamber (shell). As the product is fed through the tube, the heating medium, which is preferably steam or water, is fed into the heating chamber. Preferably, the WPC is fed into the heating tube using a high pressure pump.

Depending on the severity of heating required, the heating medium (e.g. steam) may be pressurized to achieve higher heating temperatures. Those who are skilled in the art would appreciate that there are other forms of heating systems that can be used to achieve the same end results. Other heating methods may include ohmic and microwave etc. Direct steam injection is a preferred heating method.

Spray drying is currently preferred. Preferably, the heat treatment zone is coupled directly to a spray drier fitted with a nozzle or a cluster of nozzles or a rotary atomiser or an ultrasonic atomiser for the purpose of producing a stream of droplets.

The heat treatment is usually to be of sufficient duration to denature a proportion of the whey proteins into insoluble aggregates. Preferably, the heat treatment is at least 60° C. and more preferably at least 70° C. 70° C.-150° C. is a preferred range. Most preferably, the solution is heated at 75-90° C. However, lower temperatures may be used (for example, 50-70° C. and preferably 60-70° C.). The heating times vary according not only to the temperature but also to the protein content and the ion and lactose content. Typically, the heating time is from 30 s to 15 min for temperatures in the range 70-80° C., from 10 s to 10 min for temperatures in the range 80-90° C. and from 1 s to 5 min for temperatures in the range 90-100° C. At higher temperatures, for example, with steam injection, the times may be reduced to, for example, 1-10 s. Preferably at least 30% (w/w), more preferably at least 50%, even more preferably at least 70%, most preferably at least 80% of the denaturable proteins is denatured. The denaturation percentage in the context of this specification means the percentage as determined by HPLC and calculation of the reduction of the peak area for undenatured whey proteins relative to that for unheated controls. This method is described in U.S. Pat. No. 6,767,575.

A feature of the current invention is that the whey protein concentrate, at high total solids (e.g. >20%), is heated under turbulent flow. Because of the turbulent flow, the heat transfer coefficient is very high, resulting in fast heating. Effectively, the process of this invention offers a very efficient way of manufacture of micro-particulated whey protein products.

Turbulent flow is defined as having sufficient mass flow rate in the heating tubes to provide a Reynolds number in excess of 500, more preferably in excess of 1000, even more preferably in excess of 1500, and most preferably in excess of 2000. Such Reynolds numbers are a characteristic of turbulent flow and are known in the art of hydrodynamics. The determination of the Reynolds number depends on the mass velocity of the fluid and its viscosity, which is defined as the nominal viscosity determined using the Hagen-Poiseuille equation from a measurement of the pressure drop along a known length of horizontal pipe of known uniform circular cross section at a known flowrate of the heat treated fluid at a uniform temperature before it is dried. A Reynolds number in the range 2,000-50,000 is preferred for use in the invention, preferably 5,000-30,000.

The term "not subjected to a mechanical shear process" means that the material is not subject to a process in which a mechanical device such as a homogeniser, colloid mill, high pressure pump, scraped surface heat exchanger, high shear mixer or the like is used to mix the solution or break up particles within it.

The products of the invention have a wide range of utilities. They can be used in applications where a high protein content is required but without incurring undesirable changes in the texture of the product to which they are added. The WPCs of the invention are suitable for use in processed cheese, yoghurt and whey crisps (WO/2006/019320). The WPCs of the invention are useful in applications in which the addition of high whey protein levels without undesirable alteration of the final product qualities may be required. The present WPC allows the incorporation of whey protein into snacking and convenience foodstuffs without producing undesirable textures or flavours. For example the WPC may be used to add protein to the ingredients for a snack bar that also comprises a carbohydrate source and fat. Such snack bars may be prepared by melting fat, if melting is required, and mixing fat or oil with carbohydrate and WPC and then allowing the mixture to set.

The advantage of the process of this invention is that it has only a simple heating step in addition to the standard processing of methods for dairy protein streams. Those who are skilled in the art would understand that the ability to heat treat whey protein at high TS is highly desirable for economic reasons.

One use of the invention is for making high protein yoghurts. The process comprises preparing a high protein yoghurt milk having at least 7% (w/v), preferably 8-20% (w/v), more preferably 10-16% (w/v) protein by mixing a dried WPC or WPI of the invention with a milk comprising casein, and acidifying the high protein yoghurt milk to a pH of 3.8-5.5, preferably 4.0-5.0, most preferably 4.2-4.7. Also included are processes for preparing high protein yoghurt drinks where the yoghurt milk has a protein content of 1.5-15% (w/v), but with 30-90%, preferably 40-80% of the protein being whey protein of the invention.

The yoghurt milk may include dried or liquid milk, milk retentate, milk protein concentrate (MPC), cream, or milk fat that are combined (with water if required) to form a reconstituted milk or a standardised milk composition. Skim milk is a preferred ingredient. Milk streams may be pasteurised as required by local regulations.

The high protein yoghurt milk is generally heat treated prior to acidification, preferably at 70-100° C., more preferably 80-90° C., most preferably 85-95° C., preferably for 5-20 minutes.

The acidification is most preferably carried out by fermentation using mixed cultures of *Streptococcus thermophilus* and *Lactobacillus delbrueckii* subsp. *bulgaricus*. Cultures of *Streptococcus thermophilus* and any *Lactobacillus* species are also preferred as are cultures of *Lactobacillus delbrueckii* subsp. *bulgaricus*. Where acidification is by chemical acidification, addition of glucono-delta-lactone is preferred.

"Yoghurt (yogurt)" refers to an acidic or fermented food or beverage product prepared from a dairy resource, and either viable micro-organisms or chemical acidulants or both. For the purposes of this invention yoghurt also refers to yoghurt-like products that may include non-dairy derived lipids, flavourings and food-approved stabilisers, acids and texturizers. Heat treated yoghurt and yoghurt-like products are also included by the term yoghurt. The term "yoghurt" includes yoghurts (either set or stirred), yoghurt drinks and Petit Suisse.

The products of the invention are good substrates for producing whey protein hydrolysates with minimal content of particles with molecular weight greater than 20 kD. Thus the invention provides a method of preparing a whey protein hydrolysate comprising preparing a heat-treated WPC or WPI by the method of the invention and contacting it with a protease. Such hydrolysates have applications in nutritional compositions, including infant formulas.

The WPCs and WPIs produced by methods of this invention are also useful for preparing nutritional products, including nutritional beverages, and specialist nutritional products including meal replacement products.

Specialist nutritional products (sometimes known as medical foods and enteral foods) can be prepared for patients and the elderly and administered in liquid form. One of the challenges to be overcome in the preparation of such foods is attaining sufficient calorific density i.e. kcal/mL or kcal/g. In the art, calorific densities for such foods can vary from below 0.5 kcal/mL to at least 3 kcal/mL.

A preferred embodiment of the invention comprises adding a heat-treated WPC or WPI prepared by a method of the invention or a hydrolysate prepared by a method of the invention as an ingredient in a mixture to form a nutritional product also comprising water and soluble carbohydrate, preferably also comprising oil or fat. Preferably the mixture further comprises sodium and potassium salts and a source of lipids and vitamins. Preferably the mixture is heated to a temperature above 70° C., preferably above 100° C., more preferably under at least commercial sterilising conditions. Preferably the mixture also includes a magnesium salt. Commercial sterilising conditions are conditions achieved using the application of heat or high pressure to render a product free of microorganisms capable of growing in the product at non refrigerated conditions (over 10° C. at which the product will be held during distribution and storage.

The inventive ingredient has been found to be surprisingly advantageous in the preparation of processed cheese and processed cheese foods and processed cheese-like foods.

A processed cheese may be prepared by a method comprising preparing a whey protein ingredient by the method of the invention, mixing the ingredient with other ingredients including cheese and water, cooking to form a molten processed cheese, and allowing to cool.

The invention consists in the foregoing and also envisages constructions of which the following gives examples only.

EXAMPLES

The following experiments further illustrate the practice of the invention.

Example 1

Fresh cheese whey was prepared using standard commercial ultrafiltration/diafiltration techniques to produce a retentate of about 20% total solids, of which 83% was protein. This concentrate stream was then adjusted to pH 6.9 using dilute NaOH and then further concentrated to about 33% solids using a falling film evaporator to produce a concentrate with an exit temperature of 45° C.

The warm concentrate (27% w/w protein) was fed at a flow rate of 6.3 m³/h to two high pressure steam heated shell and tube heat exchangers in series using a high pressure pump with a delivery pressure of 250-300 bar. The concentrate exits the first high pressure heater (length 60 m) at ~70° C. and exits the second high pressure heater at 80° C. The heater exchangers have a combined length of 120 m with an internal pipe diameter of 18.85 mm. The steam pressure supplied to the first heater was 0.6 bar (g) and the second heater pressure was 0.96 bar (g). The high pressure tubing was Schedule 80 rated, 316 alloy stainless steel pipe.

After emerging from the second heater, the heat treated concentrate passed through an experimental holding period of either 0 s (no tube section), 45 s (54.8 m), or 90 s (107.3 m) of 24 mm diameter pipe. Following the variable duration holding section, the heat treated concentrate was transported to the nozzle bank at the top of the spray drier; this section of pipe was about 56 m in length with an internal diameter of about 24 mm and provided a further residence time of about 23 s. Thus the high pressure pump delivered the protein concentrate stream through the heaters and holding tube (if present) to the drier without the additional need for a mechanical shear inducing device post the heater-reactor system and prior to spray drying.

At the spray drier, the heat-treated concentrate was delivered to a bank of 8 nozzles and was atomised into a droplet spray at a pressure greater than 200 bar. An inlet air temperature of 210° C. and a chamber outlet temperature of about 83° C. was used. The powder was further dried and then cooled in a vibrating fluidised bed prior to sifting and packaging of the material to produce a powder of about 3.5% moisture with a bulk density of about 0.57 g/mL.

Figure 1:
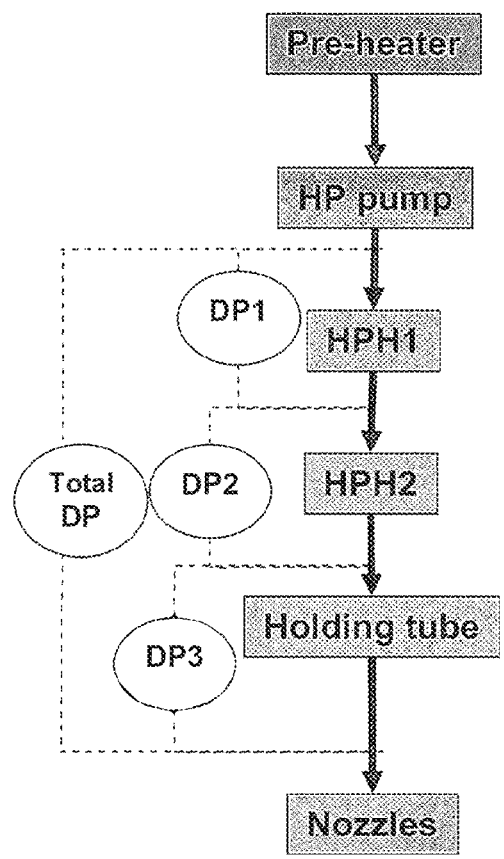
FIG. 1 shows a schematic layout of the whey protein heater-reactor system

FIG. 1 shows a schematic layout of the whey protein heater-reactor system. The points at which the system pressures were monitored are shown (DP1, DP2 & DP3).

Wet and dry stream (product) particle sizes and particle size distributions (PSD) were determined using standard techniques and were conducted using a laser diffraction particle size analyser, Mastersizer 2000, Malvern Instruments Ltd, Malvern, United Kingdom.

Samples of nutrition bars (batches of 1-2 kg) were prepared and evaluated for hardness using a model recipe. The recipe comprised 37.3% heat treated WPC of this invention (or a control using undenatured WPC392, Fonterra), 34.4% glucose syrup Penford A2150, 17.2% glycerine (Bronson & Jacobs Australia and supplied by Bronson & Jacobs NZ), 2.9% Maltodextrin, MALTRIN M180, DE 23-27, (GPC Grain Processing Co. USA and supplied by Salkat NZ) 5.1% palm kernel oil hydrogenated (Premium Vegetable Oils, Malaysia and supplied by Kauri N Z, Wellington), 0.5% lecithin (Cargill International and supplied by Bronson & Jacobs N Z), 2.6% water (w/w). The fat was weighed into a saucepan and melted on a hot plate at a temperature <40° C. The glucose syrup, glycerine, water and lecithin were weighed into a pot and heated to 55° C. on the hot plate.

The protein powder and the corn syrup solids were weighed and dry-blended together.

The liquids and the melted fat were then added to the powders and mixed at 50 rpm using a BEAR mixer (Varimixer, 17584 BMS, Baker Perkins NZ) for 1 min. The mixer was stopped and the sides of the bowl were scraped down. The mixture was mixed for a further 30 s until well combined.

The dough that was formed was then placed in a bar frame (dimension 600 mm×330 mm×16 mm), covered with plastic film and rolled into shape, to fit the frame. It was then left to set overnight at ambient temperature.

The set dough was then cut into bars of approximately 100 mm×30 mm×16 mm for the storage trial, to give 66 bars in total. The bars were placed in foil bags, heat sealed, labelled and stored for one week at 20° C. before evaluation.

Figure 2:
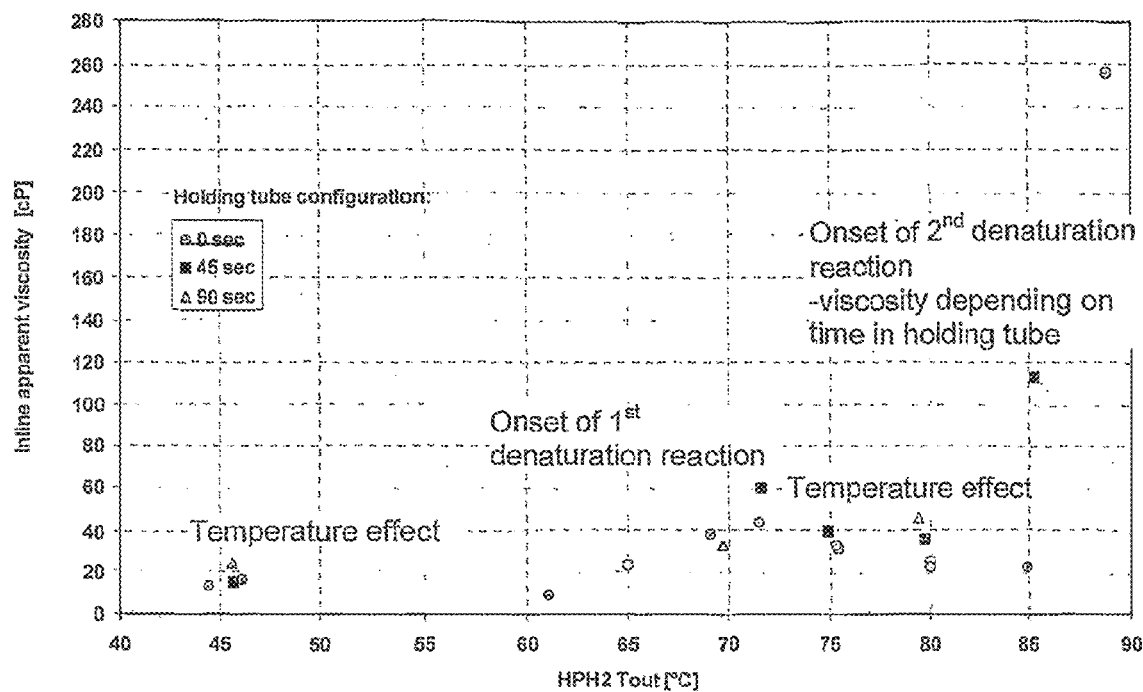
FIG. 2 reveals the relationship between apparent viscosity and combinations of holding time and treatment temperature for 27% whey protein feedstock

FIG. 2 reveals the relationship between apparent viscosity and combinations of holding time and treatment temperature for 27% whey protein feedstock. It is known in the art that the denaturation of whey proteins by heat progresses sequentially via a chain of processes to ultimately yield insoluble aggregates that if allowed to reach a few tens of micrometre in size have a gritty texture in the mouth. FIG. 2 reveals that when the heat denaturation was conducted at very high protein concentrations (%), the process could be surprisingly controlled to reveal a novel set of products at temperatures in the range 65°-80° C. with holding time of order 1 minute or less, and a further set of novel products at temperatures in excess of 80° C. and holding times less than about 120 s. Without being bound by theory, the higher temperature (second) set of products are likely to be associated with the formation of insoluble aggregates or colloidal particles of increasing size as the heat treatment conditions progress further. (Note that an additional holding time of about 23 s occurs after the experimental holding time in FIG. 2, to convey the fluid into the drier.)

Figure 3:
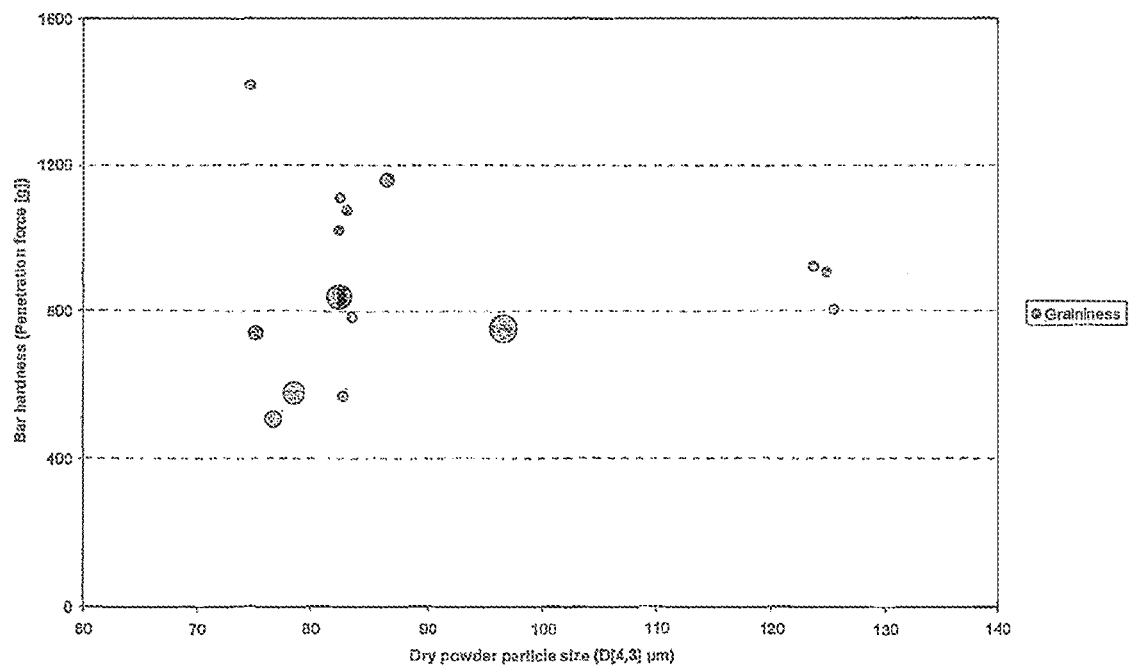
FIG. 3 shows the relationship between bar hardness (model nutrition bar samples prepared using samples of dried ingredient from the inventive process and the particle size of the ingredient samples D[4,3] (μm).

FIG. 3 shows the relationship between bar hardness (model nutrition bar samples, after one week, prepared using samples of dried ingredient from the inventive process) and the volume weighted mean particle size of the ingredient samples D[4,3] (µm). As a separate variable, the points plotted on the figure represent the sensory texture (graininess score) of the bar samples as given by the size of the circles. (The graininess score was determined by informal sensory using a scale 1-9, where 1—smooth, 3—powdery, 6—sandy & 8—grainy.)

Texture analysis was performed using a TA.HDplus Texture Analyser from Stable Micro Systems, Godalming, England.

The texture measurements were performed by compression. Forces were measured against a set distance (mm). A 5 mm stainless steel cylindrical probe was pushed into the bar at a constant rate of 1 mm/s to a compression depth of 12 mm, and was then withdrawn at a rate of 10 mm/s.

Where possible, three compressions were made over the surface of each bar sample. Two bars were evaluated for each dairy protein powder. The samples were removed from 20° C. storage and texture measurements were made at room temperature.

Surprisingly and considering the art of products prepared using homogenisation, FIG. 3 reveals that there were a set of process conditions wherein it was possible to produce coarse heat aggregated whey protein particles e.g. >100 µm that were not gritty in the mouth in a nutrition bar application without homogenization following or during the heat treatment and before drying. The process conditions required to prepare this advantageous ingredient were then examined more closely.

Figure 4:
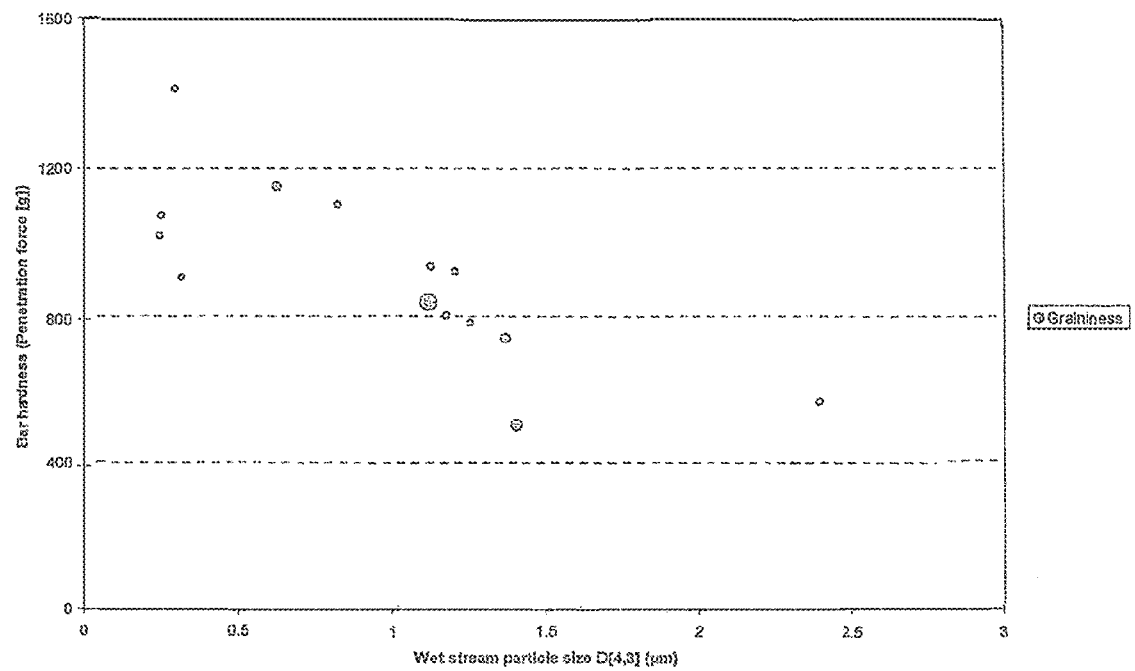
FIG. 4 shows the relationship between model nutrition bar hardness (as measured by penetration force) and the particle size distribution of the slurry stream prior to drying as represented by D[4,3] (μm).
Figure 5:
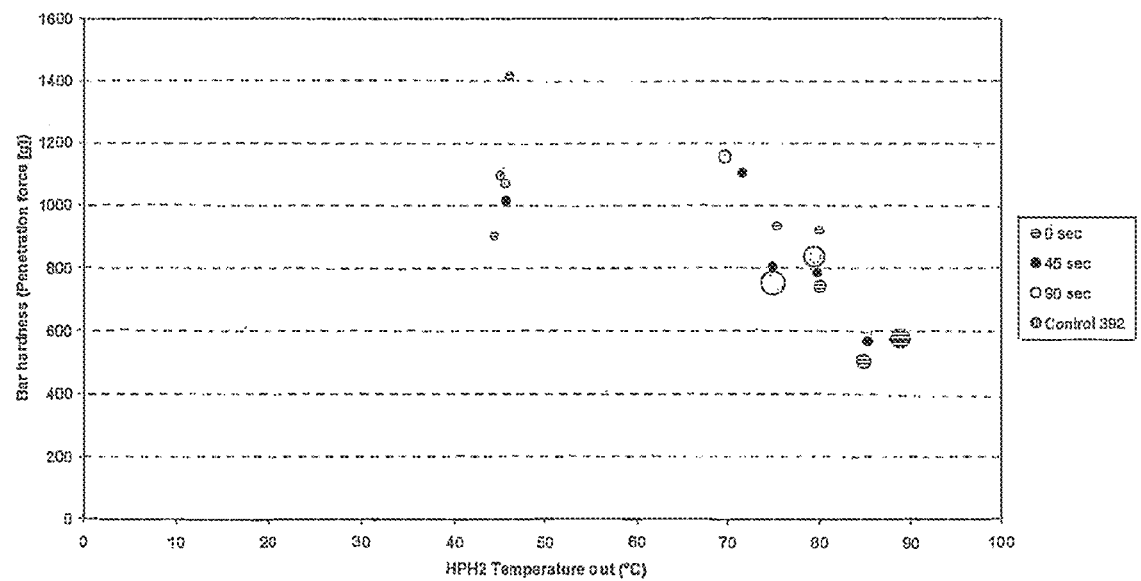
FIG. 5 shows bar texture expressed as penetration force versus heating temperature and holding tube time (s) and perceived grittiness in informal sensory (proportional to bubble size).

FIG. 4 shows the relationship between model nutrition bar hardness (as measured by penetration force) and the particle size distribution of the slurry stream prior to drying as represented by D[4,3]. The secondary variable plotted in FIG. 4 is the grittiness score of the bar samples as indicated by the size of the circle. Generally, FIG. 4 shows that softer bars result from larger colloidal particles which might generally be expected to be the result of more extensive heat treatments. However, FIG. 4 indicates that there exists a novel set of conditions where an ingredient can be prepared (after drying) from coarse particles that do not result in grittiness in the mouth as expected from prior art whey protein aggregates of similar size.

Bar texture expressed as penetration force versus heating temperature and holding tube time (s) and perceived grittiness in informal sensory (proportional to bubble size). The control was a bar sample prepared using an unheat-treated (native) whey protein powder, WPC392 (Control 392), Fonterra Co-operative Group Limited, Auckland.

Figure 12:
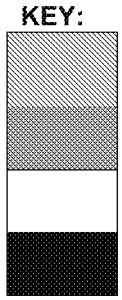
FIG. 12 illustrates Tables 1a-1d, which show processing conditions for preparation of a denatured whey protein ingredient.

Table 1d of FIG. 12 shows that when the various sets of data are combined (Tables 1a, 1b & 1c), it is revealed surprisingly that there is a set of optimal conditions for preparation of the denatured whey protein ingredient with unique properties for nutrition bar applications of <45 s seconds holding time and a final heater temperature of 80°-85° C., using the present heater design.

Example 2

The inventive protein ingredient was prepared using the method previously disclosed using a whey protein feed stream containing approximately 80% protein on a solids basis and a solids concentration of 32%, a processing flow rate of 6.4 m³/h, a high pressure preheater outlet temperature of 58° C., a final high pressure heater outlet temperature of 80° C. and a residence time from the heater exit to the dryer of 23 seconds i.e. 0 s holding tube plant configuration.

Trials were carried out to establish the texture and sensory properties of high protein yoghurt using either the inventive heat denatured whey protein ingredient or a commercial native cheese whey WPC392 (Fonterra Co-operative Group Limited, Auckland, New Zealand) as alternative sources of protein fortification. These yoghurts will be compared to a standard 4.5% protein yoghurt (3.5% protein from skim milk, 1.0% protein from SMP top-up).

Initial yoghurt trials were carried out using the ingredient of this invention and WPC392 at high levels of addition (10-15% protein yoghurts) to determine baseline textural properties. When the yoghurt milks were heated using the standard heat treatment (95° C./8 min), the milks containing WPC392 curdled and formed weak gels, and could not be further processed. Surprisingly, the protein ingredient of this invention did not gel and was able to be used to prepare a high protein yoghurt.

In other trials where WPC392 was used, it was added after the heat treatment step to reduce the potential for the added whey protein to gel.

Experimental Plan/Variables

Table 2 details the formulations and top-up ingredients for the high protein yoghurts. These are compared with a standard 4.5% protein yoghurt (0% fat) sensory control yoghurt.

TABLE 2

Experimental Plan

| Sample | Fat content (%) | Protein content (%) | protein from top-up ingredient | Top-up ingredient | Addition point of top-up ingredient |
|---|---|---|---|---|---|
| 11 | 0 | 15 | 11.5 | Inventive protein ingredient | At recombining |
| 12 | 0 | 12 | 8.5 | Inventive protein ingredient | At recombining |
| 13 | 0 | 15 | 10.5/1.0 | Inventive protien indredient/SMP | At recombining |
| 14 | 0 | 12 | 7.5/1.0 | WPC392 | At recombining |
| 15 | 0 | 15 | 11.5 | WPC392 | After heat treatment |
| 16 | 0 | 12 | 8.5 | WPC392 | After heat treatment |
| "0% fat 4.5% protein control" | 0 | 4.5 | 1.0 | SMP | At recombining |

Formulations

The formulations used are given in Table 3a and the recipes in Table 3b.

TABLE 3a

Details of the formulation used in the trials.

| Top US Blend | 11 15% protein 515 | 12 12% protein 515 | 13 15% protein 515 and SMP | 14 12% protein 515 and SMP | 15 16% protein 392 (after heat) | 16 12% protein 392 (after heat) |
|---|---|---|---|---|---|---|
| WPC515(JT02) | 100.00 | 100.00 | 100.00 | 100.00 | | |
| WPC 392 | | | | | 100.00 | 100.00 |
| SUM | 100.00 | 100.00 | 100.00 | 100.00 | 100.00 | 100.00 |
| Total Yoghurt | | | | | | |
| Top Up Blend | 14.38 | 10.63 | 13.12 | 9.37 | 14.38 | 10.63 |
| SMP | 10.48 | 10.48 | 13.46 | 13.48 | 10.48 | 10.48 |
| Potassium Sorbate | 0.02 | 0.02 | 0.02 | 0.02 | 0.02 | 0.02 |
| Chr Hansen YF-L702 | 0.02 | 0.02 | 0.02 | 0.02 | 0.02 | 0.02 |
| Water | 75.10 | 78.85 | 73.36 | 77.11 | 75.10 | 78.85 |
| SUM | 100.00 | 100.00 | 100.00 | 100.00 | 100.00 | 100.00 |
| Product Info | | | | | | |
| Total Protein (%) | 15.00 | 12.00 | 15.00 | 12.00 | 15.00 | 12.00 |
| Protein in Top Up (%) | 11.50 | 8.50 | 10.50 | 7.50 | 11.50 | 8.50 |
| MSNF(%) | 23.10 | 19.63 | 24.74 | 21.27 | 23.10 | 19.63 |
| Casein (%) | 2.80 | 2.80 | 3.60 | 3.60 | 2.80 | 2.80 |
| Whey (%) | 12.20 | 9.20 | 11.40 | 6.40 | 12.20 | 9.20 |
| Fat (%) | 0.50 | 0.39 | 0.49 | 0.38 | 0.50 | 0.39 |
| Carbohydrate (%) | 6.24 | 6.09 | 7.82 | 7.67 | 6.24 | 6.09 |
| Ash (%) | 1.24 | 1.14 | 1.45 | 1.34 | 1.24 | 1.14 |
| Total Solids (%) | 23.63 | 20.04 | 25.25 | 21.67 | 23.63 | 20.04 |
| Casein Whey | 19:81 | 23:77 | 24:76 | 30:70 | 19:81 | 23:77 |
| Calcium (mg/100 g) | 175 | 163 | 208 | 197 | 175 | 163 |
| Sodium (mg/100 g) | 110 | 92 | 116 | 96 | 110 | 92 |
| Potassium (mg/100 g) | 243 | 229 | 293 | 279 | 243 | 229 |

TABLE 3b

Recipes used to prepare the samples

| | Trial Number | | | | | | |
|---|---|---|---|---|---|---|---|
| | 11 | 12 | 13 | 14 | 15 | 16 | Reference control |
| | Trial condition | | | | | | |
| | 15% protein using inventive ingredient | 12% protein using inventive ingredient | 15% protein using inventive ingredient and SMP | 12% protein using inventive ingredient | 15% protein WPC392 (not heat treated) | 12% protein WPC392 (not heat treated) | 0% fat 4.5% protein |
| Inventive ingredient (g) | 934.7 | 691 | 852.8 | 609.1 | 0 | 0 | 0 |
| WPC392 (g) | 0 | 0 | 0 | 0 | 934.7 | 691 | 0 |
| Potassium sorbate (g) | 1.3 | 1.3 | 1.3 | 1.3 | 1.3 | 1.3 | 1.3 |
| SMP (g) | 681.2 | 681.2 | 876.2 | 876.2 | 681.2 | 681.2 | 876.2 |
| Chr. Hansen YF-L702 lactic culture (g) | 1.3 | 1.3 | 1.3 | 1.3 | 1.3 | 1.3 | 1.3 |
| Water (g) | 4882 | 5125 | 4768 | 5012 | 4882 | 5125 | 5621 |
| Total (g) | 6500 | 6500 | 6500 | 6500 | 6500 | 6500 | 6500 |

Manufacturing Process

The ingredients (other than the culture) were dispersed in warm water and allowed to stand for a period to allow proper hydration. The solutions were heated to about 55° C. and then homogenised 150/50 Bar. The samples were then batch heat treated in a water-bath at 90° C. for 10 minutes. The samples were cooled to incubation temperature and the culture added and dispersed.

Fermentation times were considerably longer for the high protein yoghurts. Incubation was at 38° C. for 15-16 hours. The samples of stirred yoghurt were sheared (smoothed) by pumping through a back pressure valve (BPV) or orifice with a pressure drop of 1.7 Bar and at a temperature of 17° C.

Figure 6:
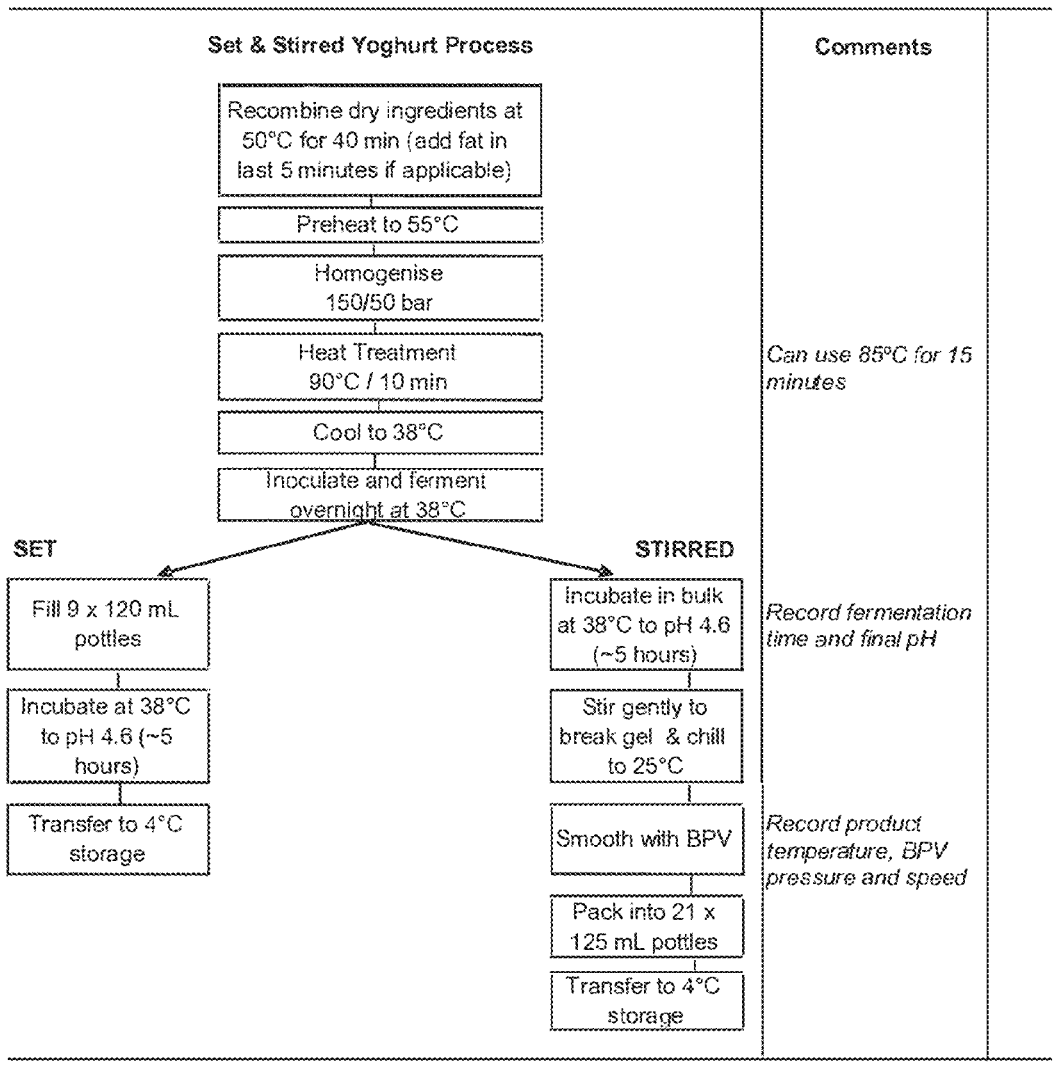
FIG. 6 shows a scheme for the process for making yoghurts.
Figure 7:
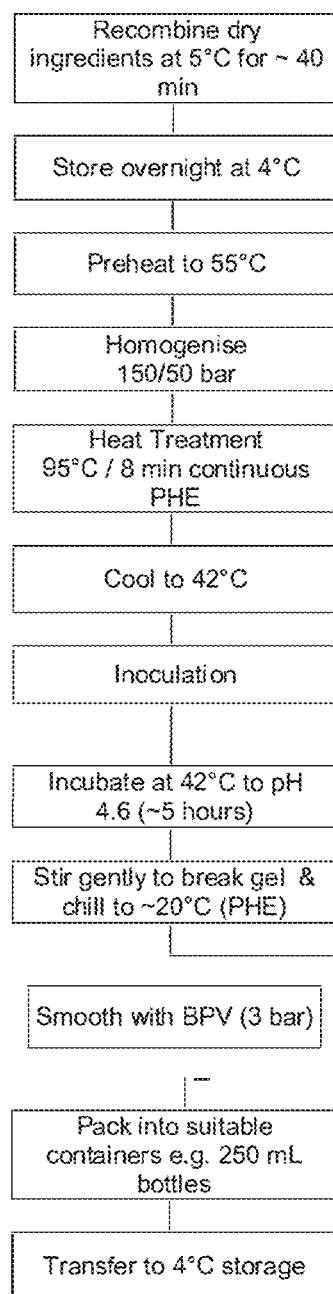
FIG. 7 shows a schematic diagram of the High Protein Drinking Yoghurt Manufacture Process.

See Yoghurt Process Diagram FIG. 6.

Results

A summary of all the trial data is given in Table 4.

TABLE 4

Summary of trial results

| Trial Number | 11 | 12 | 13 | 14 | 15 | 16 | Reference control |
|---|---|---|---|---|---|---|---|
| Final fermentation pH | 4.65 | 4.51 | 4.67 | 4.57 | 4.65 | 4.59 | 4.66 |
| Protein (TN*6.38) | 15.3 | 11.7 | 14.8 | 11.7 | 14.9 | 11.9 | 4.5 |
| Apparent viscosity at 50 s$^{-1}$ | 594 | 274 | 579 | 532 | 370 | 376 | 504 |
| Drained syneresis (%) at day 7 | 51 | 96 | 12 | 28 | 98 | 97 | 38 |

Viscosity

The viscosity of both 15% protein yoghurts (3.5% SMP with 11.5% protein of the inventive protein ingredient and 4.5% SMP with 10.5% of the inventive protein ingredient) were around 590 mPa·s. Surprisingly, the viscosity was similar to a 4.5% protein yoghurt (Table 4). The viscosity of the 12% protein yoghurt (with 3.5% protein SMP base) was also lower than the non-inventive controls.

Syneresis

The syneresis values of the stirred yoghurts are shown in Table 4.

The syneresis values of the 12% protein yoghurt (3.5% protein SMP base) and the 2 two yoghurts containing WPC392 were very high (>90%). The inventive 15% protein yoghurt and 12% protein yoghurts (4.5% protein SMP base) were lower or similar to a standard 4.5% protein yoghurt.

Informal Sensory

The samples were evaluated informally by 5 members of the cultured foods team. The flavour of the inventive high protein yoghurts were perceived to have less "protein" flavour than the samples containing WPC392.

Example 3 High Protein Drinking Yoghurt with Low Viscosity

The inventive protein ingredient was prepared using the method of Example 1 using a whey protein feed stream containing approximately 80% protein on a solids basis and a solids concentration of 32%, a processing flow rate of 6.4 m³/h, a high pressure preheater outlet temperature of 58° C., a final high pressure heater outlet temperature of 80° C. and a residence time from the heater exit to the dryer of 23 seconds i.e. 0 s holding tube plant configuration.

Trials were carried out to manufacture high protein drinking yoghurt with viscosity low enough for the final product to be consumed as a beverage.

Experimental Plan/Variables

Formulations

The recipes are given in Table 1.

TABLE 5

Recipes for the preparation of the fermented beverage

| Component | Quantity (g) | |
|---|---|---|
| | High protein Inventive beverage | 4.5% low fat yoghurt (control) |
| Dried denatured whey protein ingredient of this invention | 847 | 0 |
| Skim milk powder | 2239.6 | 876.2 |
| Sugar | 660 | 0 |
| Cream (40% fat) | 660 | 0 |
| Potassium sorbate | 4.4 | 1.3 |
| Chr Hansen culture YF-L702 | 0.4 | 1.3 |
| Water | 17589 | 5621 |
| Total | 22,000 | 6500 |
| Composition | % | |
| Total protein | 6.50 | 4.5 |
| Fat | 1.47 | Nil |
| Carbohydrate | 8.8 | — |
| Casein:whey protein (ratio) | 43:57 | 80:20 |

Manufacturing Process

The ingredients (other than the culture) were dispersed in warm water and allowed to stand for a period to allow proper hydration. The milk was heated to about 55° C. and 2-stage homogenised 150/50 Bar. The homogenised milk was heated to 95° C. for 8 minutes by circulating in a plate heat exchanger (PHE) then cooled to incubation temperature in a further PHE and finally discharged into small vat. Culture was added and dispersed and the milk was incubated at 42° C. until pH of about 4.6 was reached.

The incubation time was around 5.5 hours. Despite the high protein content, the fermentation time was surprisingly typical of much lower protein (e.g. 4.6%) yoghurts.

The high protein drinking yoghurt was cooled to approximately 20° C. by pumping it through a PHE, then sheared (smoothed) by passing it through a back pressure valve (BPV) or orifice with a pressure drop of 3 Bar.

See diagram of the high protein drinking yoghurt manufacturing process FIG. 2.

Results

A summary of the trial results is given in Table 6.

TABLE 6

Summary of trial results

| Trial Number | High Protein Drinking Yoghurt | Reference control (0% fat, 4.5% protein, as above) |
|---|---|---|
| pH at end of fermentation | 4.56 | 4.66 |
| pH at 7 days | 4.46 | |
| Protein (TN*6.38) | 6.1 | 4.5 |
| Apparent viscosity at 50 s$^{-1}$ | 205 | 504 |

Viscosity

The viscosity of the high protein drinking yoghurt was less than half that of a 4.5% (low fat) skim milk yoghurt control making the product surprisingly suitable as a yoghurt beverage.

Example 4 Preparation of Enzyme Treated Hydrolysates

A common recipe was used to screen five protein samples: undenatured 80% whey protein concentrate (WPC) [control 1], and three inventive denatured whey proteinates, T13, T14 and T21 and a fully denatured lactalbumin powder [control 2]—see below for details.

Other protein ingredients used were:

Lactalbumin 8254 (control 2), available Fonterra Co-operative Group Limited, Auckland.

Lactalbumin 8254 is 100% denatured.

Sodium caseinate 180 available from Fonterra Co-operative Group Limited, Auckland.

Cheese WPC80 (WPC392) available from Fonterra Co-operative Group Limited, Auckland. WPC392 is essentially native whey protein i.e. 0% denatured.

A range of inventive denatured WPC powders (denaturation >95%) were reacted with Alcalase and Thermoase (together) using the same recipe (1% Alcalase and 1% Thermoase) and known art control whey protein ingredients used for comparison were WPC392 and lactalbumin 8254.

Details of the hydrolysis recipe are given in Table 7.

TABLE 7

Recipe used for the enzymatic hydrolysis of the protein ingredient

| Trial Basis | 1000 g |
|---|---|
| Protein ingredient (Total Solids 6%) | 60 g |
| Mass Water | 940 g |
| Total Enzyme | 0.60 g Alcalase |
| | 0.60 g Thermoase |
| Subsequently added for pH adjustment: | |
| NaOH (diluted 10% w/w) | 3.06 g |
| KOH (diluted 10% w/w) | 14.57 g |

940 g of RO water was heated to 65° C. in a waterbath 60 g of the protein ingredient was added to the water over 5 min with continuous stirring.

The pH was adjusted to pH 7.5 using NaOH and KOH if required

At T=0 min both Alcalase and Thermoase enzymes were added to the solution (pH 7.5 thermostat at 65° C.)

The pH of the reaction mixture was maintained at 7.5 during the course of the digestion by adding alkali as indicated in Table 3

The hydrolysis was for 5 hrs total reaction time.

The reacted solution was heated at 85° C. for 20 min to inactivate the enzymes.

The molecular weight profile (MWP) was analysed using size-exclusion chromatography using the method disclosed at ANZSMS22 (Australia and New Zealand Society for Mass Spectrometry 22nd annual conference) in Sydney, January 2009.

The following are trial hydrolysate batches prepared using the dried denatured WPC ingredient of this invention (and a control WPC392). The ingredient of this invention advantageously gave a desired MWP, which is <1% of material in the >20 kDa region.

The same recipe (enzyme combination) for hydrolysis of the T13, T14 and T21 powders was used.

The ingredients of this invention were prepared according to the heat treatment procedures specified below.

T13=85° C. 0s no supplementary tube holding time

T14=90° C. 0s supplementary tube holding time

T21=85° C. 45 s supplementary tube holding time

Details of the recipes are given in Table 8.

TABLE 8

Recipe used in further hydrolysis trials

| | |
|---|---|
| Trial Basis | 1000 g |
| Total Solids 6% | 60 g |
| Mass Water | 940 g |
| Total Enzyme (2%) | 1.2 g |
| NaOH @ 10% w/w | 3.06 g |
| KOH @ 10% w/w | 14.57 g |

A variety of enzymes, including proteolytic enzymes, are used in the preparation of human nutrition products. Different nations have differing regulations. The European Union appears to be evolving regulations towards lists of specifically approved enzymes. http://www.amfep.org/documents/Amfep%2009%2001%20-%20Amfep%20Statement%-20on%20Food%20Enzymes%20Regulation%20-%20FIAP%20-JAN09.pdf For the purposes of demonstrating the beneficial and versatile outcomes of the ingredient of this invention when used as a substrate for proteolysis, a selection of enzymes were selected for screening of proteolytic efficacy.

The enzymes used were supplied by:
Alcalase 2.4L—Novozymes Australia Pty. Ltd (www.novozymes.com),
Enzidase TSP Concentrate (TSP)—Zymus International Ltd (www.zymus.net),
Pancreatin—American Laboratories Inc (www.americanlaboratories.com),
Thermoase PC10F—Daiwa Kasei K.K (Shiga, Japan).

Enzymes TSP and Pancreatin were used individually in substitution of the pair of enzymes used in Table 7 to prepare a further series of hydrolysates according to the details given in Table 9.

TABLE 9

Details of enzymes and their reaction conditions

| Enzyme | Dose (% wrt Total Solids) | Target pH | Optimal Temp |
|---|---|---|---|
| TSP | 2 | 7.5 | 55° C. |
| Pancreatin | 2 | 8.0 | 50° C. |

Table 10 summarises the MWP resulting from the hydrolysates prepared using the Alcalase and Thermoase combination detailed in Table 7.

TABLE 10

Comparison of denaturation levels and resulting hydrolysed MWPs of reacted samples

| Ingredient | Level of denaturation (%) | >20 kDa | 5-20 kDa | 1-5 kDa | <1 kDa |
|---|---|---|---|---|---|
| WPC392 (Control WPC) | 0 | 2.96 | 3.61 | 25.62 | 67.81 |
| T13 | 96 | 0.92 | 1.37 | 17.56 | 80.15 |
| T14 | 94 | 0.89 | 1.14 | 18.49 | 79.47 |
| T21 | 99 | 0.82 | 1.26 | 18.11 | 79.81 |
| Lactalbumin 8254 (Control) | 100 | 1.21 | 2.95 | 30.23 | 65.62 |

It is generally desirable that less than 1% of the peptide has a molecular weight >20 kDa in hydrolysates designed for infant formulates where reduced antigenicity claims are made. The ingredient of this invention surprisingly was able to meet this limit without the need for extra treatment steps, thus avoiding the expense and yield loss of subsequent ultrafiltration. Tables 11 and 12 summarise the yield and processing problems typically presented by preparing hydrolysates using known art processes and compares these to the benefits arising from the invention.

TABLE 11

Comparison of yield advantage of inventive ingredient with commercial lactalbumin

| | Lactalbumin 8254 | Denatured WPC of this invention |
|---|---|---|
| Yield loss in substrate manufacture | There is a significant protein (as TN*6.38) yield loss when making conventional lactalbumin. | There was negligible yield loss when making denatured ingredient of this invention. |

TABLE 12

Comparison of yield advantages of inventive ingredient with existing commercial hydrolysates

| | Hydrolysate made from Lactalbumin | Potential hydrolysate from WPC of this invention |
|---|---|---|
| Yield loss in hydrolysate manufacture | Hydrolysis of Lactalbumin 8254 under typical hydrolysis conditions produces a hydrolysate with >1% in the >20 kDa fraction. Further purification can obtain <1% material in the >20 kDa fraction and this step will involve a yield loss. | Hydrolysis of the denatured ingredient of this invention allowed the desired MWP profile to be prepared without ultrafiltration. |

Hydrolysis of One of the Above Inventive Powders (T13) Using Different Recipes (Enzymes).

A further series of hydrolysis reactions using the inventive T13 ingredient (96% denatured) and two different recipes (enzymes Pancreatin and TSP) were conducted with the results given in Tables 13 and 14.

TABLE 13

Results of hydrolysis using Pancreatin enzyme

| Enzyme (2% dose) | Substrate | >20 kDa | 5-20 kDa | 1-5 kDa | <1 kDa |
|---|---|---|---|---|---|
| Pancreatin | T13 | 0.47 | 1.85 | 29.70 | 67.98 |
| Pancreatin | Lactalbumin 8254 | 3.82 | 2.36 | 30.42 | 63.39 |
| Pancreatin | WPC392 | 1.02 | 1.60 | 29.49 | 67.89 |

The ingredient of this invention when treated with Pancreatin gave a more preferred MWP that avoided the need for ultrafiltration to remove excess >20 kDa material.

TABLE 14

Results of hydrolysis using TSP enzyme

| Enzyme (2% dose) | Substrate | >20 kDa | 5-20 kDa | 1-5 kDa | <1 kDa |
|---|---|---|---|---|---|
| TSP | T13 | 0.49 | 2.03 | 35.17 | 62.31 |
| TSP | Lactalbumin 8254 | 2.40 | 3.01 | 32.20 | 62.39 |
| TSP | WPC392 | 1.58 | 1.37 | 30.09 | 66.96 |

The ingredient of this invention when treated with TSP gave a more preferred MWP that avoided the need for ultrafiltration to remove excess >20 kDa material.

Two further hydrolysis reactions were conducted using the inventive protein ingredient but modified to the extent that the protein ingredient was obtained directly following the thermal denaturation procedure of the invention as a liquid inert stream (~90% denatured) and before drying, using different recipes (enzymes) and shown in Table 15. Table 15 also summarises the results of hydrolysing the liquid stream ingredient of this invention.

TABLE 15

Results of hydrolysing the inventive liquid protein stream

| Enzyme (dose) | >20 kDa | 5-20 kDa | 1-5 kDa | <1 kDa |
|---|---|---|---|---|
| Pancreatin (2%) | 0.58 | 2.00 | 30.46 | 66.96 |
| Alcalase 2.4 L (2%) | 0.22 | 1.29 | 32.71 | 65.79 |

The un-dried ingredient version of this invention (liquid stream) again gave a preferred MWP that avoided the cost of drying and the need for subsequent treatment to remove unwanted content >20 kDa.

Example 5 Liquid Nutrition/Beverage/Enteral/Medical Foods Examples

The following two examples illustrate the use of the inventive whey protein ingredient to prepare model beverages with the special properties useful in a variety of nutritional and medical foods. In one series the beverage had a calorific value of 1 kcal/g. In the second series, the beverage had a calorific value of 1.5 kcal/g.

For each of the calorific values, three formulations were examined:
 a) 95% of the protein heat denatured whey protein powder of this invention and 5% comes from sodium caseinate'
 b) A replicate of (a) above,
 c) A control of 100% heat denatured whey protein powder of this invention and no sodium caseinate.

28 kg of 55° C. demineralised water was weighed into the Cowles Dissolver Protein added and mixed for 60 minutes Maltodextrin and sucrose was added and mixed for 5 minutes The minerals were pre-dissolved in 50° C. in a small amount of water and mixed for 5 min The mineral solution was added to the ingredients into the Cowles Dissolver and mixed for 5 min The solution was warmed further The oil and lecithin was warmed to aid dispersion and mixed in a separate container The oil-lecithin mixture was added to the Cowles Dissolver solution and thoroughly dispersed The dispersed and still warm solution was two-stage homogenised The homogenised solution was cooled to 25° C. and the pH adjusted to target pH 6.8 with KOH Water was added to the solution to top up as required to give a final weight of 40 kg The solution was transferred to the UHT plant and UHT processed at 140° C. for 4 sec using direct steam injection heating packed aseptically into 250 mL glass bottles and capped.

Various tests were conducted before and after the UHT heat treatment.

1 Kcal/g Model Nutritional Foods Type Formulation

Formulation (a) differed from formulation (b) in that a replicate batch of inventive ingredient was prepared for use. Formulation (c) used the ingredient from the second batch. The formulations are detailed in Table 16.

TABLE 16

Model formulation and recipes for 1 kcal/g beverage examples

| | Percentage Based Formulations | | |
|---|---|---|---|
| Ingredients | Formulation (a) | Formulation (b) | Formulation (c) |
| Water | 75.8% | 75.9% | 75.9% |
| Heat denatured whey protein ingredient | 4.6% | 4.5% | 4.7% |
| Sodium caseinate 180 | 0.2% | 0.2% | 0.0% |
| Sucrose | 4.4% | 4.4% | 4.4% |
| Maltrin M180 maltodextrin | 11.1% | 11.1% | 11.1% |
| Tri-sodium citrate di-hydrate | 0.6% | 0.6% | 0.6% |
| Potassium chloride | 0.2% | 0.2% | 0.2% |
| Tri-potassium citrate monohydrate | 0.1% | 0.1% | 0.1% |
| Magnesium chloride | 0.2% | 0.2% | 0.2% |
| Tri-calcium phosphate | 0.3% | 0.3% | 0.3% |
| Canola oil | 2.3% | 2.3% | 2.3% |
| Lecithin | 0.1% | 0.1% | 0.1% |
| Pilot Plant Trials | 40 L beverage | | |
| Ingredients | g | g | g |
| Water | 30336.5 | 30348.5 | 30344.9 |
| Heat denatured whey protein ingredient | 1839.4 | 1811.2 | 1894.9 |
| Sodium caseinate 180 | 78.9 | 77.5 | 0.0 |
| Sucrose | 1752.8 | 1762.8 | 1756.1 |
| Maltrin M180 maltodextrin | 4452.7 | 4452.2 | 4454.9 |
| Tri-sodium citrate di-hydrate | 251.6 | 251.7 | 256.3 |
| Potassium chloride | 83.9 | 83.9 | 84.0 |
| Tri-potassium citrate monohydrate | 44.9 | 44.9 | 44.8 |
| Magnesium chloride | 74.9 | 74.9 | 74.9 |
| Tri-calcium phosphate | 123.8 | 123.8 | 123.9 |
| Canola oil | 906.7 | 916.9 | 913.6 |
| Lecithin | 53.9 | 51.7 | 51.7 |
| Solids sum | 9663.5 | 9651.5 | 9655.1 |
| % Total Solids | 24.2% | 24.1% | 24.1% |

1.5 Kcal/g Model Nutritional Foods Type Formulation

The formulations used for the 1.5 kcal/g evaluations are shown in Table 17.

TABLE 17

Formulation and recipes for 1.5 kcal/g beverage examples

| | Percentage Based Formulations | | |
|---|---|---|---|
| Ingredients | Formulation (a) | Formulation (b) | Formulation (c) |
| Water | 68.80% | 68.79% | 68.76% |
| Heat denatured whey protein ingredient | 6.56% | 6.51% | 6.85% |
| Sodium caseinate 180 | 0.29% | 0.30% | 0.0% |
| Sucrose | 5.64% | 5.60% | 5.62% |
| Maltrin M180 maltodextrin | 14.19% | 14.28% | 14.24% |

TABLE 17-continued

| Formulation and recipes for 1.5 kcal/g beverage examples | | | |
|---|---|---|---|
| Tri-sodium citrate di-hydrate | 0.25% | 0.24% | 0.26% |
| Sodium chloride | 0.22% | 0.22% | 0.22% |
| Potassium chloride | 0.13% | 0.11% | 0.11% |
| Tri-potassium citrate monohydrate | 0.12% | 0.14% | 0.14% |
| Magnesium chloride | 0.20% | 0.19% | 0.19% |
| Tri-calcium phosphate | 0.21% | 0.21% | 0.21% |
| Canola Oil | 3.23% | 3.25% | 3.23% |
| Lecithin | 0.16% | 0.16% | 0.16% |

| Pilot Pilot Trials | 40 L beverage | | |
|---|---|---|---|
| Ingredients | | | |
| Water | 27518.9 | 27514.5 | 27503.7 |
| Heat denatured whey protein ingredient | 2623.0 | 2605.2 | 2739.7 |
| Sodium caseinate 180 | 117.4 | 118.4 | 0.0 |
| Sucrose | 2257.2 | 2239.5 | 2246.7 |
| Maltrin M180 maltodextrin | 5678.0 | 5711.9 | 5697.2 |
| Tri-sodium citrate di-hydrate | 98.6 | 97.0 | 103.1 |
| Sodium chloride | 88.1 | 88.9 | 89.4 |
| Potassium chloride | 54.0 | 45.6 | 45.0 |
| Tri-potassium citrate monohydrate | 48.1 | 56.1 | 56.7 |
| Magnesium chloride | 78.0 | 77.7 | 77.7 |
| Tri-calcium phosphate | 83.6 | 83.5 | 83.6 |
| Canola oil | 1292.3 | 1299.1 | 1293.0 |
| Lecithin | 62.7 | 62.7 | 64.3 |
| Solids sum | 12481.1 | 12485.5 | 12496.3 |
| % Total Solids | 31.2% | 31.2% | 31.2% |

The results of the evaluation of the samples prepared according to the formulations of Tables 16 and 17 are shown in Table 18.

TABLE 18

| | | | Viscosity | Particle Size | |
|---|---|---|---|---|---|
| | Run # | pH | (cP) Brookfield | D[4,3] (μm) | D[3,2] (μm) |
| Table of 1 kcal/mL results | | | | | |
| Before HT | Formulation (a) | 6.83 | 5.6 | 0.63 | 0.24 |
| | Formulation (b) | 6.83 | 5.6 | 0.66 | 0.25 |
| | Formulation (c) | 6.87 | 5.2 | 0.79 | 0.27 |
| After HT | Formulation (a) | 6.82 | 6.7 | 1.83 | 0.33 |
| | Formulation (b) | 6.79 | 6.8 | 1.62 | 0.33 |
| | Formulation (c) | 6.80 | 5.9 | 0.97 | 0.27 |
| 1.5 kcal/mL | | | | | |
| Before HT | Formulation (d) | 7.04 | 9.7 | 0.85 | 0.27 |
| | Formulation (e) | 6.73 | 10.6 | 1.05 | 0.33 |
| | Formulation (f) | 6.73 | 10.4 | 0.81 | 0.24 |
| After HT | Formulation (d) | 6.98 | 10.1 | 1.24 | 0.37 |
| | Formulation (e) | 6.69 | 13.3 | 2.56 | 0.60 |
| | Formulation (f) | 6.68 | 10.0 | 1.43 | 0.41 |

Example 6 Use of Direct Steam Injection to Produce Heated Liquid Whey Protein Stream in Turbulent Flow Conditions that is Useful as a Protein Ingredient A protein concentrate solution was obtained by reconstituting a 25 kg cheese WPC 392 powder in 70 litres of chlorinated water. The WPC powder had 81% protein, 5.7% fat, 3.4% ash, 4% lactose, and 4% moisture. After reconstitution the whey protein solution was continuously mixed at 50° C. for 2 hours to allow complete hydration of the protein.

The whey protein solution (pH 6.8) was pumped through a pilot plant product line at 152.5 kg/h (~137.4 L/h, product density of 1.11 kg/L) where it was heated by direct injection of steam at ~170° C. and ~7 bar gauge via a steam injection valve. The product line was a 5 m long, 10 mm i.d. stainless steel tube. The steam pressure was adjusted to between 5-7 bar gauge so that the product temperature was maintained at about 90° C. The product flow through the DSI unit had a calculated Reynolds number of 599. The heated liquid was collected via product valve ~5 m after the DSI point. It took ~3 s for the product to travel from the steam injection point to the collection point. The heated stream was 89.1° C. at the exit of the DSI.

The heated stream was collected into a container and it became a semisolid paste upon cooling to room temperature. This heated stream was used as a protein and water source in making the model nutritional food formulation shown in the Table 19 below. A sample of the original WPC powder was used in preparation of another sample of the nutritional food formulation as a control.

TABLE 19

| Recipe of a model nutritional formulation | |
|---|---|
| Ingredients | g |
| Water | 197.84 |
| Liquid protein ingredient of this invention | 48.53 |
| Sucrose | 80.82 |
| Maltrin maltodextrin | 37.33 |
| Tri-potassium citrate monohydrate | 0.80 |
| Potassium chloride | 0.49 |
| Lecithin | 0.60 |
| Canola oil | 33.60 |
| Total (g) | 400.00 |

The preparation of the nutritional formulations involved reconstitution of the protein ingredient with water at 55° C. for 30 min using an overhead stirrer. The sucrose, maltrin, and minerals were added while mixing and then the mixing continued for further 10 minutes. The mixture was heated to 70° C. then the oil (with lecithin already dissolved in it by mixing at ~70° C.) was added then mixing continued for further 10 min. The mixture was then two-stage homogenised (200/50 bars) using a bench-top homogeniser (NIRO-SOAVI, Panda No 2638, Niro Group, Parma-Italy). The homogenised formulation was then placed in 10 ml retortable glass bottles then heated at 121° C. for 10 min in an oil bath. The heated samples were cooled immediately to 20° C. in cold water. The viscosities of the homogenised formulations before and after heating were measured using a Paar Physica rheometer (model UDS200, Anton Paar GmbH, Graz, Austria) with a cone and plate geometry, shear sweep 0.1 to 500 s-1, at 20° C.

Figure 8:
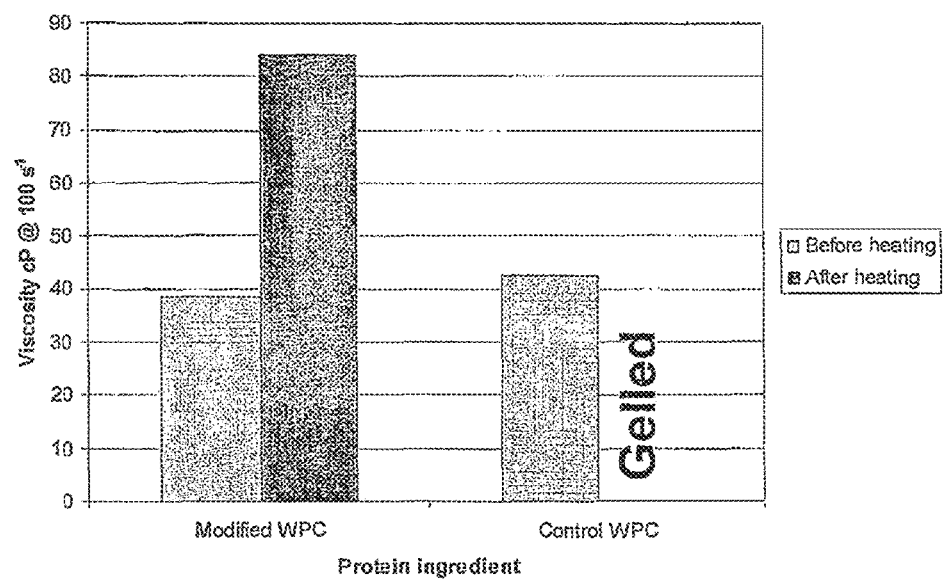
FIG. 8 shows the viscosity in cP @ 100 s$^{-1}$ for the Modified WPC before heating, Modified WPC after heating, Control WPC before heating and Control WPC after heating (from left to right).

FIG. 8 shows the effect of the modified WPC on the viscosity of the model nutritional food formulation before and after heating (121° C., 10 min). The viscosities of both formulations before heating were similar. After heating, the viscosity of the formulation containing modified WPC increased to about 84 cP. The inventive product remained a smooth free flowing drinkable product. However, after heating the control formulation containing standard WPC had formed a gel making the viscosity measurement impossible.

Figure 9:
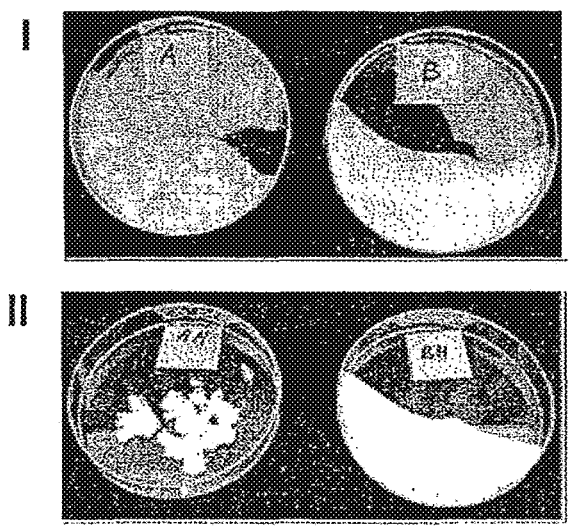
FIG. 9 shows photos of a nutritional food formulation before (I) or after (II) heating. A=formulation containing standard WPC; B=formulation containing modified WPC; H=heated.

FIG. 9 shows photographs of the formulations before and after heating. It is clear that the formulation containing modified WPC remained a smooth free flowing liquid while that containing standard WPC formed a gel.

Nutritional formulations are used as meal replacers for a wide range of consumers to meet various nutritional and/or lifestyle requirements. These foods are aimed to provide the full nutritional requirements in small packs of drink. As such they often contain high fat, carbohydrate, and protein such as those in the model formulation given in Table 19 above. Their processing always involved severe heat treatment (e.g. 121° C. for 10 min) because of the need to be microbiologically safe. In such heat treatment it is important to have robust ingredients that are able to withstand the severe heat treatment conditions without gelling or forming solid lumps. This example demonstrated that using the inventive heat modified WPC of this invention allowed addition of whey protein at high level (>9%) in a nutritional formulation that remained smooth liquid (low viscosity) after its final product heat treatment.

Example 7

This study was carried out using a Rapid Visco Analyser (RVA 4). A model individually wrapped slice (IWS) processed cheese formulation containing ~4% of either cheese whey derived WPC 392 (80% protein) or inventive heat denatured whey protein ingredient was used for the comparison. The firmness and melt of the resulting products were measured along with their composition and microstructure.

Objectives

To compare the performance of standard whey protein concentrate (WPC) 392 and inventive heat denatured whey protein ingredient by:
1. Making IWS processed cheese in an RVA using the two whey protein concentrates.
2. Comparing the properties of the resulting processed cheese samples.

Methods and Materials

Two processed cheese slice formulations were manufactured in a Rapid Visco Analyser (RVA). A simple model IWS processed cheese formulation was used which contains ~4% WPC392 or inventive heat denatured whey protein ingredient. Run 1 contained the standard WPC392 and Run 2, the inventive heat denatured whey protein ingredient. The actual formulations are tabulated in Table 20.

TABLE 20

Formulations used to prepare samples

| Ingredient | Control with WPC392 (g) | Sample with inventive ingredient (g) |
|---|---|---|
| Rennet casein | 3.34 | 3.34 |
| Added water | 10.78 | 10.78 |
| Tri-sodium citrate | 0.72 | 0.72 |
| Salt | 0.33 | 0.33 |
| High solids cheese (Cheddar) | 5.97 | 5.97 |
| Salted butter | 6.83 | 6.83 |
| WPC392 | 1.32 | NA |
| Inventive ingredient | NA | 1.32 |
| Lactose | 0.47 | 0.47 |
| Citric acid | 0.21 | 0.21 |
| Potassium sorbate | 0.03 | 0.03 |
| Total weight | 30.00 | 30.00 |

TABLE 20-continued

Formulations used to prepare samples

| Analysis | % | % |
|---|---|---|
| Moisture | 47.3 | 47.3 |
| Fat | 52.7 | 52.7 |
| Protein | 18.3 | 18.3 |
| Salt | 1.8 | 1.8 |

The methods used in this work were taken directly from published PCT patent application WO 2007/108708 A1 (Wiles, Lee, Anema and Havea)

Blending

Rennet casein, WPC, trisodium citrate, salt and water were mixed together and allowed to hydrate for 40 minutes in an aluminium RVA canister. Grated cheese, salted butter, lactose, citric acid and potassium sorbate were added and mixed in.

Cooking

The cheese blends were cooked in the RVA for 10 min. The temperature was increased from 25° C. to 87° C. over the first 4 minutes and held for the remaining 6 minutes at 87° C. The stirring speed was increased from 0 to 800 rpm over the first 4 min and held at 800 rpm for the remaining 6 min. On completion of cooking, the hot processed cheese sample was poured onto a polypropylene sheet, covered with another polypropylene sheet, and rolled into a slice. The slice was sealed in a zip-lock plastic bag and quickly cooled on an aluminium tray in a fridge. 6 slices were made for each run. The viscosity was recorded on the RVA immediately prior to forming each slice.

Composition

Moisture was analysed using a conventional oven method (16 hours at 105° C.). pH was measured using a Radiometer PHM82 Standard pH meter and N48 EE probe.

Texture Measurements

The slices were held at 5° C. for 3 days prior to testing. For the texture testing, 4 slices were stacked together, cut in half, and the two halves stacked. Thus the test stack was 8 slices thick.

Firmness was measured using penetrometry (¼" cylinder [6.4 mm]) on a TA-HD Texture Analyser (aka Cylinder Test) at 13° C. The cylinder was inserted 10 mm into the stack of slices, at a speed of 1 mm s-1 and the peak force was recorded. 4 measurements were taken.

Stress and strain were measured at 13° C. using a Vane Test (Brookfield 5XHBTDV-II viscometer). A 6 mm, 4-bladed Vane was inserted to a depth of 10 mm, and rotated at 0.5 rpm until the yield point was reached. 4 measurements were recorded.

Melts were measured using a Schreiber Melt Test (232° C. for 5 min, Zehren and Nusbaum 1992) Process Cheese. Cheese Reporter Publishing Company.

Results

Composition

The moisture and pH data is shown in Table 21. The moisture and pH of the samples are very consistent. This means that differences in texture and melt properties are likely to be due to differences in ingredient performance rather than compositional variation.

Evaporation of moisture occurs during the cheese manufacture in the RVA. The moisture was not adjusted for evaporation during processing as this is assumed to be constant between batches. The consistent moisture data in Table 21 confirms this approach.

TABLE 21

Summary of results

| Runs | | Standard WPC392 | Inventive ingredient |
|---|---|---|---|
| Viscosity | | | |
| Ex-RVA | (cP) | 1795± | 1483± |
| | | Cylinder | |
| Force | (N) | 5.86± | 6.75± |
| | | Vane | |
| Stress | (Pa) | 12505± | 15020± |
| Strain | (rad) | 0.797± | 0.866± |
| | | Melt test | |
| Schreiber | | 2.3± | 7.0± |
| | | Composition | |
| Final pH | (%) | 5.61± | 5.60± |
| Moisture | | 46.3± | 46.6± |

Results are indicated ±1 standard deviation.

Final Viscosity

The average final viscosities are tabulated in Table 21.

The final viscosity is clearly different with the processed cheese containing WPC392 higher than that containing inventive heat denatured whey protein ingredient.

Firmness as Measured by the Cylinder Test

The firmness results are recorded in Table 21. The firmness of the IWS made from standard WPC392 appears to be lower than the IWS made from the inventive heat denatured whey protein ingredient. As the moisture and pH of the samples are almost identical (and the protein and fat content by inference) then the difference in firmness is due to the WPC ingredients.

Stress and Strain Results as Measured by the Vane Test

The Vane stress results are tabulated in Table 21. The pattern of the stress data matches the firmness data with the stress of the processed cheese made from WPC392 being lower than the inventive ingredient.

The Vane strain results are tabulated in Table 21. The strain data from the IWS made from standard WPC392 is lower than that made from the inventive ingredient.

Melt

The melt results are presented in Table 21. The IWS made from standard WPC392 melts significantly less than that made from the inventive ingredient.

Summary

IWS made with the inventive ingredient melted more than cheese made with WPC392

IWS made with the inventive ingredient was firmer than cheese made with WPC392

IWS made with the inventive ingredient had lower in-process viscosity than cheese made with WPC392

The composition of the slices was relatively uniform (moisture and pH) as was the microstructure. This suggests that any textural differences are not due to compositional variation.

Example 8

Figure 10:
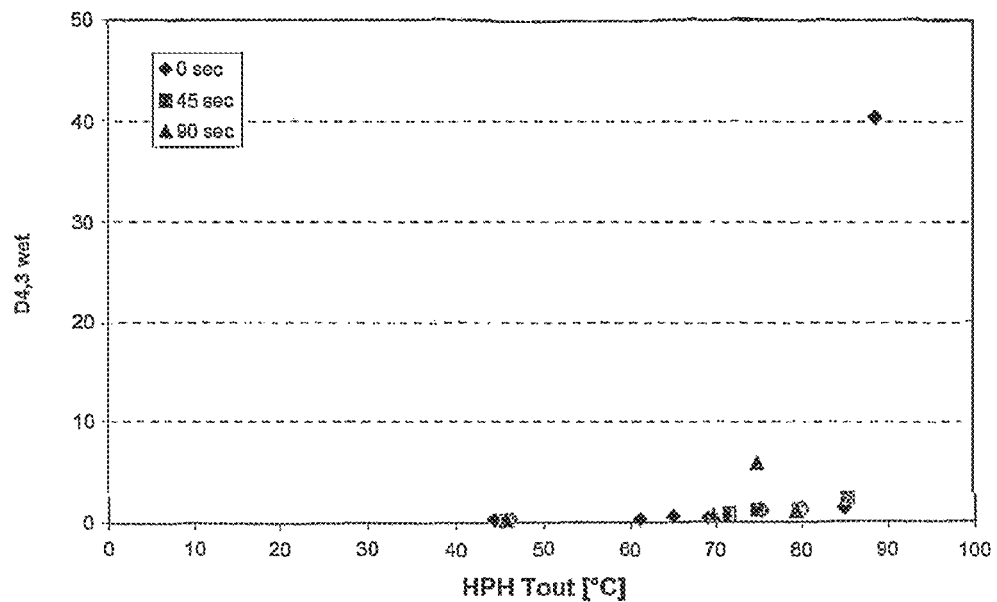
FIG. 10 shows particle sizes prepared ex the tubular reactor.

Characterisation of the Liquid Stream Emerging from the High Pressure Tubular Reactor Prior to Drying FIG. 10 shows that very fine particle dispersions can be prepared ex the tubular reactor of this invention.

Figure 11:
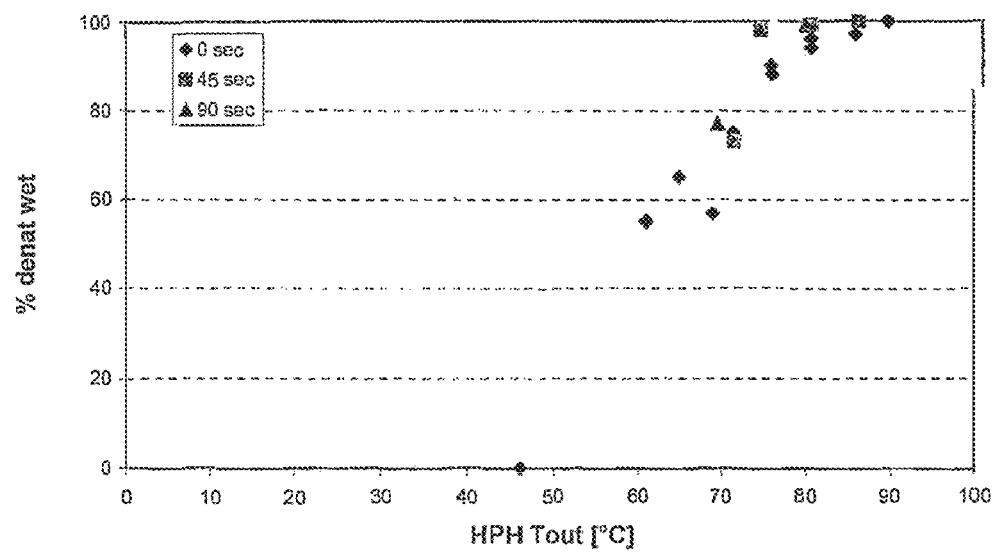
FIG. 11 shows a graph of percentage denaturation versus exit temperature at different holding times.

FIG. 11 shows that the extent of denaturation can be finely controlled in the liquid stream emerging from the tubular reactor by adjusting the combinations of the temperature and holding times.

The invention claimed is:

1. A method for preparing a mixture comprising a liquid whey protein concentrate (WPC) or whey protein isolate (WPI), comprising:
   (a) providing an aqueous WPC or WPI solution having a protein concentration of 15-50% (w/v), at a pH of between 5.5 and 8.5;
   (b) pressurizing the provided aqueous solution into a flow path;
   (c) heat treating the pressurized solution to more than 50° C. and not more than 150° C., for a time that allows protein denaturation to occur, wherein at least 50% of denaturable proteins are denatured, said time being less than about 120 s; the heat treating comprising heating the solution while under conditions of turbulent flow with a Reynold's number of at least 500 and wherein the volume weighted mean particle size D[4,3] of the whey protein particles in the pressurized solution is less than about 10 µm and the pressurized solution is not subjected to a mechanical shear process to break up particles within the solution; and
   (d) at the end of the heat treatment, either
      (i) transferring the heat treated material directly to a mixer to be mixed with at least one other ingredients, including at least one of the group consisting of milk, skim milk, fat, a carbohydrate, milk retentate, or skim milk retentate, or
      (ii) transferring the heat treated material promptly to a drier and drying the heat treated WPC or WPI;
   wherein the heat-treated WPC or WPI is not subjected to a mechanical shear process to break up particles within the solution prior to either the optional drying step or the optional mixing step other than a mechanical shear wherein liquid is converted into droplets to facilitate drying.

2. The method as claimed in claim 1, wherein at the end of the heat treatment, the heat treated material is transferred directly to a drier.

3. The method as claimed in claim 1, wherein at the end of the heat treatment, the heat treated material is directly transferred either to a drier to be dried or to a mixer to be mixed with other ingredients; and wherein the heat treated WPC or WPI is not subjected to particle size reduction prior to step (d).

4. The method as claimed in claim 1, wherein at the end of the heat treatment, the heat treated material is promptly transferred to a drier; and wherein the heat-treated WPC or WPI is not subjected to a mechanical shear process prior to drying other than where liquid is converted into droplets to facilitate drying.

5. The method as claimed in claim 1, wherein at the end of the heat treatment, the heat treated material is directly transferred to a mixer to be mixed with at least one other ingredients, including at least one of the group consisting of milk, skim milk, fat, a carbohydrate, milk retentate, or skim milk retentate, wherein the heat-treated WPC or WPI is not subjected to a mechanical shear process prior to mixing with other ingredients.

6. The method as claimed in claim 1, wherein the pH of the WPC solution prior to heating is adjusted to between 5.0 and 8.5.

7. The method as claimed in claim 1, wherein the protein concentration of the WPC solution prior to heating is 16-40%.

8. The method as claimed in claim 1, wherein the heat treating occurs as the WPC or WPI solution passes along a heated flow path with an inside diameter greater than 5 mm and less than 150 mm.

9. The method as claimed in claim 1, wherein the solution passes along a heated flow path and exits at a temperature between 60° C. and 110° C.

10. A method of increasing the protein content of a foodstuff by including a WPC or WPI prepared by the method of claim 1 in the ingredients of the foodstuff.

11. The method as claimed in claim 10 wherein the foodstuff is a snack bar prepared by a method comprising melting fat, if melting is required, and mixing fat or oil with carbohydrate and WPC and allowing the mixture to set.

12. A method of preparing a yoghurt comprising including a dried WPC or WPI prepared by the method as claimed in claim 1 as an ingredient in yoghurt.

13. The method as claimed in claim 12 comprising preparing a yoghurt milk having at least 7% (w/v) protein by mixing the dried WPC or WPI with a milk comprising casein, and acidifying the yoghurt milk to a pH of 3.8-5.5.

14. A method of preparing a yoghurt drink comprising 1.5-15% (w/v) protein comprising mixing a dried WPC or WPI prepared by the method as claimed in claim 1 with a milk comprising casein, and acidifying to a pH of 3.8-5.5.

15. A method for preparing a whey protein hydrolysate comprising preparing a heat-treated WPC or WPI by the method as claimed in claim 1 and contacting the heat-treated WPC or WPI with a protease.

16. A method for preparing a processed cheese comprising:
   preparing a whey protein ingredient by a method as claimed in claim 1;
   mixing the ingredient with other ingredients including cheese and water;
   cooking to form a molten processed cheese; and
   allowing to cool.

17. A method for preparing a dried modified WPC or WPI with 50-95% of the total solids as whey protein, comprising:
   (a) preparing an aqueous WPC or WPI having 15-50% (w/v) whey protein at a pH of between 5.5 and 8.5;
   (b) using a high pressure pump to feed the protein concentrate at a pressure of between 3 to 1000 bars into a high pressure heater, the flow of the product is such that a turbulent flow is effected with a Reynolds number of at least 500;
   (c) heat treating the solution while the turbulent flow is effected to more than 70° C. and not more than 150° C. for a time that allows protein denaturation to occur, wherein at least 50% of denaturable proteins are denatured, said time being less than about 120 s, and wherein the pressurized protein concentrate is not subjected to a mechanical shear process to break up particles within the solution;
   (d) at the end of the heat treatment, promptly transferring the heat-treated material to a drier; and
   (e) drying the heat-treated WPC or WPI,
   wherein the volume weighted mean particle size D[4,3] of the whey protein particles in the treated WPC stream from the heat treatment arrangement (c) is less than about 10 μm and the particles are not subject to a particle size reduction procedure prior to drying.

18. The method as claimed in claim 17 wherein the heat treatment of step (c) occurs in a zone which is coupled directly to the inlet of the drier.

19. A method as claimed in claim 17, wherein the drying is by spray drying.

20. The method as claimed in claim 17, wherein the turbulent flow has a Reynolds number in the range 2,000-50,000.

* * * * *